United States Patent [19]

Saotome

[11] Patent Number: 5,038,037

[45] Date of Patent: Aug. 6, 1991

[54] RADIATION IMAGE RECORDING AND READ-OUT APPARATUS

[75] Inventor: Shigeru Saotome, Kanagawa, Japan

[73] Assignee: Fuji Photo Film Co., Ltd., Kanagawa, Japan

[21] Appl. No.: 572,537

[22] Filed: Aug. 27, 1990

Related U.S. Application Data

[63] Continuation of Ser. No. 291,929, Dec. 29, 1988, abandoned.

[30] Foreign Application Priority Data

Dec. 29, 1987 [JP] Japan ............................ 62-335507
Jan. 20, 1988 [JP] Japan ............................ 63-10114
Mar. 19, 1988 [JP] Japan ............................ 63-66754

[51] Int. Cl.$^5$ .......................................... G01N 23/04
[52] U.S. Cl. .............................. 250/327.2; 250/484.1
[58] Field of Search .................... 250/327.2, 484.1; 378/171

[56] References Cited

U.S. PATENT DOCUMENTS

| 3,567,931 | 3/1971 | Eelkema | 378/171 |
| 4,543,479 | 9/1985 | Kato | 250/327.2 K |
| 4,737,641 | 12/1988 | Lange et al. | 250/327.2 E |
| 4,835,386 | 5/1989 | Shimura et al. | 250/484.1 B |
| 4,855,598 | 8/1989 | Ohgoda et al. | 250/484.1 B |
| 4,883,961 | 11/1989 | Arakawa et al. | 280/327.2 D |

FOREIGN PATENT DOCUMENTS

| 112469 | 7/1984 | European Pat. Off. | 250/327.2 A |
| 142865 | 5/1985 | European Pat. Off. | 250/327.2 D |
| 1124938 | 6/1986 | Japan | 250/327.2 H |

Primary Examiner—Carolyn E. Fields
Attorney, Agent, or Firm—Sughrue, Mion, Zinn, Macpeak & Seas

[57] ABSTRACT

A radiation image recording and read-out apparatus comprises stimulable phosphor layers provided respectively on one surface and the other surface of a flexible belt, which belt changes the distribution of the radiation energy, whereby radiation images containing different embedded images on a specific structure of an object are recorded on the two stimulable phosphor layers with a single, simultaneous exposure to radiation. The two stimulable phosphor layers may be provided as two separate sheets. Two independent image read-out sections for reading out the radiation images stored on the stimulable phosphor layers, and two independent erasing sections for erasing radiation energy remaining on the stimulable phosphor layers are provided for the two stimulable phosphor layers, so that the two radiation images are read out simultaneously. Alternatively, each image read-out section and erasing section pair may be provided as separate readout and erasing unit.

1 Claim, 11 Drawing Sheets

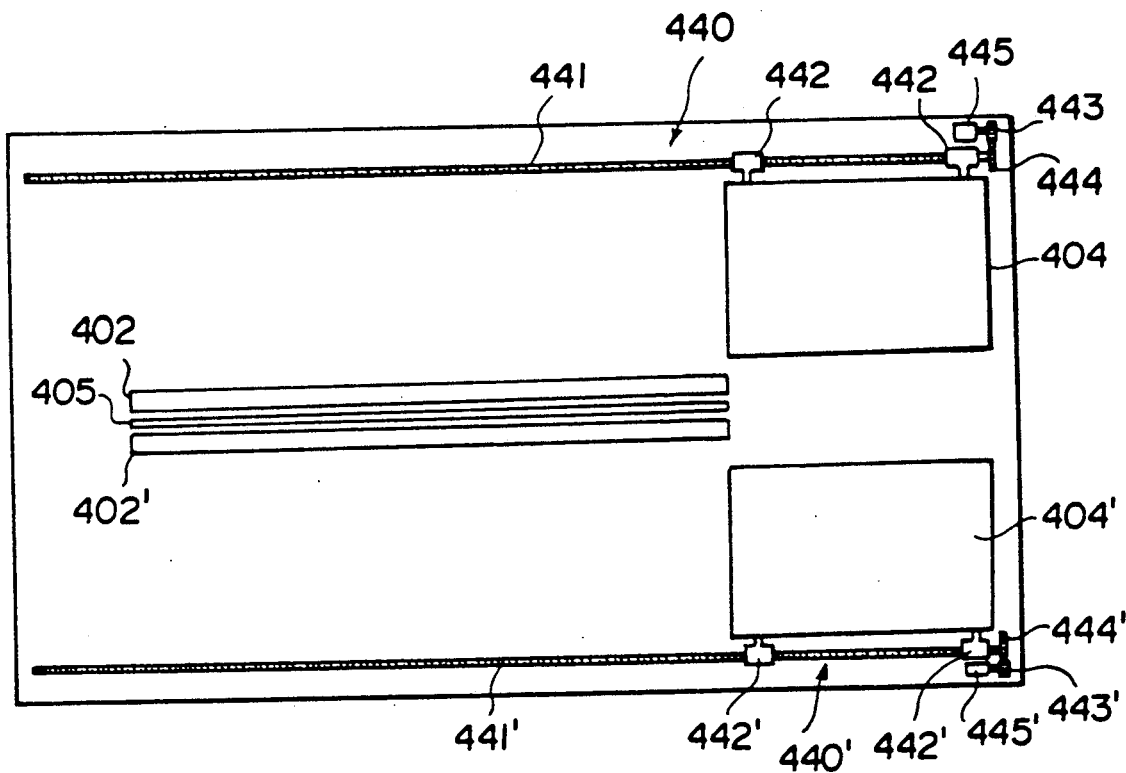

RADIATION IMAGE RECORDING AND READ-OUT APPARATUS

This is a continuation of application Ser. No. 291,929, filed Dec. 29, 1988, now abandoned.

BACKGROUND OF THE INVENTION

FIELD OF THE INVENTION

This invention relates to a radiation image recording and read-out apparatus for recording a radiation image on each of several stimulable phosphor layers or on each of several stimulable phosphor sheets, exposing each stimulable phosphor layer or each stimulable phosphor sheet to stimulating rays which cause the stimulable phosphor layer or the stimulable phosphor sheet to emit light in proportion to the stored radiation energy, and detecting the emitted light to read out the radiation image as an electric image signal. This invention particularly relates to a radiation image recording and read-out apparatus wherein an image signal for forming an image of only a specific structure, i.e. only a certain part of the whole stored radiation image, is obtained.

DESCRIPTION OF THE PRIOR ART

When certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to radiation passing through an object such as the human body in order to have a radiation image of the object stored thereon, and is then scanned with stimulating rays which cause it to emit light in proportion to the stored radiation energy. The light emitted by the stimulable phosphor sheet upon stimulation thereof is photoelectrically detected and converted into an electric image signal, which is processed as desired to reproduce a visible image with good image quality and a high diagnostic efficiency and accuracy. The visible image finally obtained may be reproduced in the form of a hard copy or may be displayed on a cathode ray tube (CRT). In this radiation image recording and reproducing system, the stimulable phosphor sheet is used to temporarily store the radiation image in order to reproduce the final visible image therefrom on a final recording medium. For economical reasons, therefore, it is desirable that the stimulable phosphor sheet by used repeatedly.

In order to reuse stimulable phosphor sheets as mentioned above, the radiation energy remaining on the stimulable phosphor sheet after it is scanned with stimulating rays should be erased by exposing the stimulable phosphor sheet to light or heat as described in, for example, U.S. Pat. No. 4,400,619 or Japanese Unexamined Patent Publication No. 56(1981)-12599. The stimulable phosphor sheet may then be used again for radiation image recording.

On the other hand, subtraction processing of radiation images has heretofore been known. In subtraction processing of radiation images, two radiation images recorded under different conditions are photoelectrically read out to obtain digital image signals, which are then subjected to subtraction processing with respect to the corresponding picture elements of the images, thereby to obtain a difference signal representing an image of a specific structure contained in the radiation images. The subtraction processing method makes it possible to reproduce a radiation image of a specific structure by use of the difference signal thus obtained.

Basically, subtraction processing is carried out by either the so-called temporal (time difference) subtraction processing method or the so-called energy subtraction processing method. In the former method, the image of a specific structure is extracted by subtracting the image signal of a radiation image obtained without injection of contrast media from the image signal of a radiation image in which the image of the specific structure is enhanced by the injection of contrast media. In the latter method, an object is exposed several times to radiation with different energy distributions, or the energy distribution of radiation passing through an object is changed after being irradiated onto one of two radiation storage means, after which the radiation exposes the second storage means. In this manner, two radiation images, in each of which the image of a specific structure is embedded, are obtained. Thereafter, the image signals of the two radiation images are weighted appropriately, when necessary, and subjected to a subtraction process to extract the image of the specific structure.

Subtraction processing is extremely effective, particularly for medical diagnosis, and electronics research has continued to develop subtraction processing methods.

In the aforesaid radiation image recording and reproducing system utilizing the stimulable phosphor sheet, the radiation image stored on the stimulable phosphor sheet is read out directly as an electric image signal. Therefore, with the radiation image recording and reproducing system, the aforesaid subtraction processing can readily be carried out. When energy subtraction processing is to be carried out, a radiation energy converting filter constituted of a copper plate or the like may be provided between two stimulable phosphor sheets. In this case radiation images, each containing different images of a specific structure, can be stored on the two stimulable phosphor sheets by, for example, simultaneously exposing the two stimulable phosphor sheets to radiation passing through an object. (This technique is called one-shot energy subtraction.)

Therefore, in order to carry out one-shot energy subtraction processing, the radiation image recording apparatus may be constituted so that radiation image recording is carried out by providing two stimulable phosphor sheets and the radiation energy converting filter in the manner mentioned above. Thereafter, two sets of image signals may be obtained by sequentially carrying out the same image read-out operations done for ordinary image read-out.

However, when two stimulable phosphor sheets are sequentially subjected to the image read-out operations, the time taken for the image read-out operations becomes long. Therefore, it has heretofore not always been possible to carry out energy subtraction processing in the manner mentioned above, particularly in the case of mass medical examinations.

SUMMARY OF THE INVENTION

The primary object of the present invention is to provide a radiation image recording and read-out apparatus, which uses stimulable phosphor layers and quickly carries out an energy subtraction process.

Another object of the present invention is to provide a radiation image recording and read-out apparatus, which uses stimulable phosphor sheets and quickly carries out an energy subtraction process.

The specific object of the present invention is to provide a radiation image recording and read-out apparatus which markedly increases the diagnostic efficiency in mass medical examinations or the like.

A first radiation image recording and read-out apparatus in accordance with the present invention is characterized in that stimulable phosphor layers are provided on one surface and the other surface of a belt. The belt converts the radiation energy, thus recording radiation images which contain different images of a specific structure on the two stimulable phosphor layers by a single exposure to radiation. Also, two independent image read-out sections for reading out the radiation images stored on the stimulable phosphor layers and two independent erasing sections for erasing radiation energy remaining on the stimulable phosphor layers are provided for the two stimulable phosphor layers, so that the two radiation images are read out simultaneously.

Specifically, the present invention provides a first radiation image recording and read-out apparatus comprising:

i) a long strip-shaped flexible belt formed of a material which converts radiation energy, ii) a first stimulable phosphor layer and a second stimulable phosphor layer for storing a radiation image thereon, said first stimulable phosphor layer and said second stimulable phosphor layer being provided, respectively, on one surface and the other surface of said flexible belt, iii) a belt feed means for positioning said flexible belt and moving said flexible belt in its longitudinal direction returnably, so that desired portions of said flexible belt may be positioned for exposure to radiation, iv) an image recording section for irradiating radiation carrying image information onto portions of said first stimulable phosphor layer and said second stimulable phosphor layer positioned so as to be exposed to the radiation, thereby to store radiation images respectively on said first stimulable phosphor layer and said second stimulable phosphor layer, v) a first image read-out section for exposing said first stimulable phosphor layer carrying the radiation image stored thereon to stimulating rays which are produced by a stimulating ray irradiation means and which cause said first stimulable phosphor layer to emit light in proportion to the stored radiation energy, and detecting the emitted light by use of a photoelectric read-out means to obtain an image signal, vi) a second image read-out section for exposing said second stimulable phosphor layer carrying the radiation image stored thereon to stimulating rays which are produced by a stimulating ray irradiation means and which cause said second stimulable phosphor layer to emit light in proportion to the stored radiation energy, and detecting the emitted light by use of a photoelectric read-out means to obtain an image signal, vii) a first erasing section for releasing radiation energy remaining on said first stimulable phosphor layer, on which the image read-out has been carried out at said first image read-out section, before recording of a next image is to be carried out on said first stimulable phosphor layer, viii) a second erasing section for releasing radiation energy remaining on said second stimulable phosphor layer, on which the image read-out has been carried out at said second image read-out section, before recording of a next image is to be carried out on said second stimulable phosphor layer, and ix) a subtraction operating section for obtaining an image signal for forming an image of a specific structure, which image signal is extracted from said image information by carrying out subtraction processing of corresponding picture elements of said image signals obtained at said first image read-out section and said second image read-out section.

With the first radiation image recording and read-out apparatus in accordance with the present invention, the first stimulable phosphor layer and the second stimulable phosphor layer are provided respectively on one surface and the other surface of the flexible belt acting as a radiation energy converting filter so that radiation images for subtraction processing are stored simultaneously on the first stimulable phosphor layer and the second stimulable phosphor layer. Also, the first image read-out section and the second image read-out section are provided respectively for the first stimulable phosphor layer and the second stimulable phosphor layer so that the radiation images stored on the first stimulable phosphor layer and the second stimulable phosphor layer are read-out simultaneously. Therefore, with the first radiation image recording and read-out apparatus in accordance with the present invention, subtraction processing can be carried out quickly. Particularly, the diagnostic efficiency in mass medical examinations or the like can be increased markedly.

A second radiation image recording and read-out apparatus in accordance with the present invention is characterized by having two long strip-shaped, flexible stimulable phosphor sheets in parallel, having a radiation energy converting filter constituted of a copper plate or the like between the two stimulable phosphor sheets, and recording radiation images, in which different images of a specific structure are embedded, on the two stimulable phosphor sheets with a single, simultaneous exposure to radiation. Also, two independent image read-out sections for reading out the radiation images stored on the stimulable phosphor sheets and two independent erasing sections for erasing radiation energy remaining on the stimulable phosphor sheets are provided for the two stimulable phosphor sheets, so that the two radiation images are read out simultaneously.

Specifically, the present invention also provides a second radiation image recording and read-out apparatus comprising:

i) a long strip-shaped, flexible first stimulable phosphor sheet capable of storing a radiation image thereon, ii) a first sheet feed means for positioning said first stimulable phosphor sheet and moving said first stimulable phosphor sheet in its longitudinal direction returnably, so that desired portions of said first stimulable phosphor sheet may be positioned for exposure to radiation, iii) a long strip-shaped, flexible second stimulable phosphor sheet capable of storing a radiation image thereon, iv) a second sheet feed means for positioning said second stimulable phosphor sheet parallel to said first stimulable phosphor sheet and moving said second stimulable phosphor sheet its longitudinal direction returnably, so that desired portions of said second stimulable phosphor sheet may be positioned for exposure to radiation, v) a radiation energy converting filter provided between the portions of said first stimulable phosphor sheet and the portions of said second stimulable phosphor sheet positioned for exposure to radiation, vi) an image recording section for irradiating radiation carrying image information onto portions of said first stimulable phosphor sheet and portions of said second stimulable phosphor sheet positioned so as to be exposed to the radiation, thereby to store radiation images on said first stimulable phosphor sheet and said second stimulable phosphor sheet, vii) a first image read-out section for exposing said first stimulable phosphor sheet carrying the radiation image stored thereon to stimulating rays which are produced by a stimulating ray irradiation means and which cause said first stimulable phosphor sheet to emit light in proportion to the stored radiation energy, and reading out the emitted light by use of a photoelectric read-out means to obtain an image signal, viii) a second image read-out section for exposing said second stimulable phosphor sheet carrying the radiation image stored thereon to stimulating rays which are produced by a stimulating ray irradiation means and which cause said second stimulable phosphor sheet to emit light in proportion to the stored radiation energy, and reading out the emitted light by use of a photoelectric read-out means to obtain an image signal, ix) a first erasing section for releasing radiation energy remaining on said first stimulable phosphor sheet, on which the image read-out has been carried out at said first image read-out section, before recording of a next image is to be carried out on said first stimulable phosphor sheet, x) a second erasing section for releasing radiation energy remaining on said second stimulable phosphor sheet, on which the image read-out has been carried out at said second image read-out section, before recording of a next image is to be carried out on said second stimulable phosphor sheet, and xi) a subtraction operating section for obtaining an image signal for forming an image of a specific structure, which image signal is extracted from said image information by carrying out subtraction processing of corresponding picture elements of said image signals obtained at said first image read-out section and said second image read-out section.

With the second radiation image recording and read-out apparatus in accordance with the present invention, the first stimulable phosphor sheet and the second stimulable phosphor sheet are provided so that radiation images for subtraction processing are stored simultaneously on the first stimulable phosphor sheet and the second stimulable phosphor sheet. Also, the first image read-out section and the second image read-out section are provided respectively for the first stimulable phosphor sheet and the second stimulable phosphor sheet so that the radiation images stored on the first stimulable phosphor sheet and the second stimulable phosphor sheet are read-out simultaneously. Therefore, with the second radiation image recording and read-out apparatus in accordance with the present invention, subtraction processing can be carried out quickly. Particularly, the diagnostic efficiency in mass medical examinations or the like can be increased markedly.

A third radiation image recording and read-out apparatus in accordance with the present invention is characterized by having stimulable phosphor layers on one surface side and the other surface side of a radiation energy converting filter, and recording different radiation images respectively on the two stimulable phosphor layers through a single exposure to radiation. Also, two independent read-out and erasing units, each comprising an image read-out means for reading out the radiation image stored on the stimulable phosphor layer and an erasing means for erasing radiation energy remaining on the stimulable phosphor layer, are provided respectively for the two stimulable phosphor layers. The read-out and erasing units are reciprocally moved over the respective stimulable phosphor layers so that image read-out and erasing are carried out simultaneously for the two radiation images.

Specifically, the present invention further provides a third radiation image recording and read-out apparatus comprising:

i) a first stimulable phosphor layer, ii) a second stimulable phosphor layer provided parallel and close to said first stimulable phosphor layer, iii) a radiation energy converting filter provided between said first stimulable phosphor layer and said second stimulable phosphor layer, iv) an image recording section for irradiating radiation carrying image information onto said first stimulable phosphor layer and said second stimulable phosphor layer, thereby to store radiation images on said first stimulable phosphor layer and said second stimulable phosphor layer, v) a first read-out and erasing unit comprising, combined into a single unit:

a) a first image read-out means provided with a stimulating ray irradiation means for irradiating stimulating rays, which cause said first stimulable phosphor layer carrying the radiation image stored thereon to emit light in proportion to the stored radiation energy in a predetermined direction, a photoelectric read out means for reading out the emitted light and generating an image signal, and b) a first erasing means for releasing radiation energy remaining on said first stimulable phosphor layer on which the image read-out process has been finished, vi) a second read-out and erasing unit comprising, combined into a single unit:

a) a second image read-out means provided with a stimulating ray irradiation means for irradiating stimulating rays, which cause said second stimulable phosphor layer carrying the radiation image stored thereon to emit light in proportion to the stored radiation energy in a predetermined direction, and a photoelectric read-out means for reading out the emitted light and generating an image signal, and b) a second erasing means for releasing radiation energy remaining on said second stimulable phosphor layer on which the image read-out process has been finished, vii) a first unit movement means for reciprocally moving said first read-out and erasing unit in a direction normal to the direction of irradiation of said stimulating rays such that said first unit movement means faces said first stimulable phosphor layer, viii) a second unit movement means for reciprocally moving said second read-out and erasing unit in a direction normal to the direction of irradiation of said stimulating rays such that said second unit movement means faces said second stimulable phosphor layer, and ix) a subtraction operating section for obtaining an image signal for forming an image of a specific structure, which image signal is extracted from said image information by carrying out subtraction processing of corresponding picture elements of said image signals obtained by said first read-out and erasing unit and said second read-out and erasing unit, wherein said first stimulable phosphor layer, said second stimulable phosphor layer, and said radiation energy converting filter are supported at an image recording position facing said image recording section, said first read-out and erasing unit carries out image read-out and erasing for said first stimulable phosphor layer, and said second read-out and erasing unit carries out image read-out and erasing for said second stimulable phosphor layer.

In the third radiation image recording and read-out apparatus in accordance with the present invention, the first stimulable phosphor layer and the second stimulable phosphor layer may be secured to the radiation energy converting filter and thus combined integrally therewith. Alternatively, the first stimulable phosphor layer and the second stimulable phosphor layer may be provided on supports or the like and may thus be provided separately from the radiation converting filter.

With the third radiation image recording and readout apparatus in accordance with the present invention, the first stimulable phosphor layer and the second stimulable phosphor layer are provided respectively on one surface side and the other surface side of the radiation energy converting filter so that radiation images for subtraction processing are stored simultaneously on the first stimulable phosphor layer and the second stimulable phosphor layer. Also, the reciprocally moveable read-out and erasing units are provided respectively for the first stimulable phosphor layer and the second stimulable phosphor layer so that read-out and erasing are carried out simultaneously for the radiation images stored on the first stimulable phosphor layer and the second stimulable phosphor layer. Therefore, with the third radiation image recording and read-out apparatus in accordance with the present invention, subtraction processing can be carried out quickly. Particularly, the diagnostic efficiency in mass medical examinations or the like can be increased markedly.

BRIEF DESCRIPTION OF THE DRAWINGS

FIG. 7 is a perspective view showing the unit movement means in the embodiment shown in FIG. 6A.

DESCRIPTION OF THE PREFERRED EMBODIMENTS

The present invention will hereinbelow be described in further detail with reference to the accompanying drawings.

Figure 1:
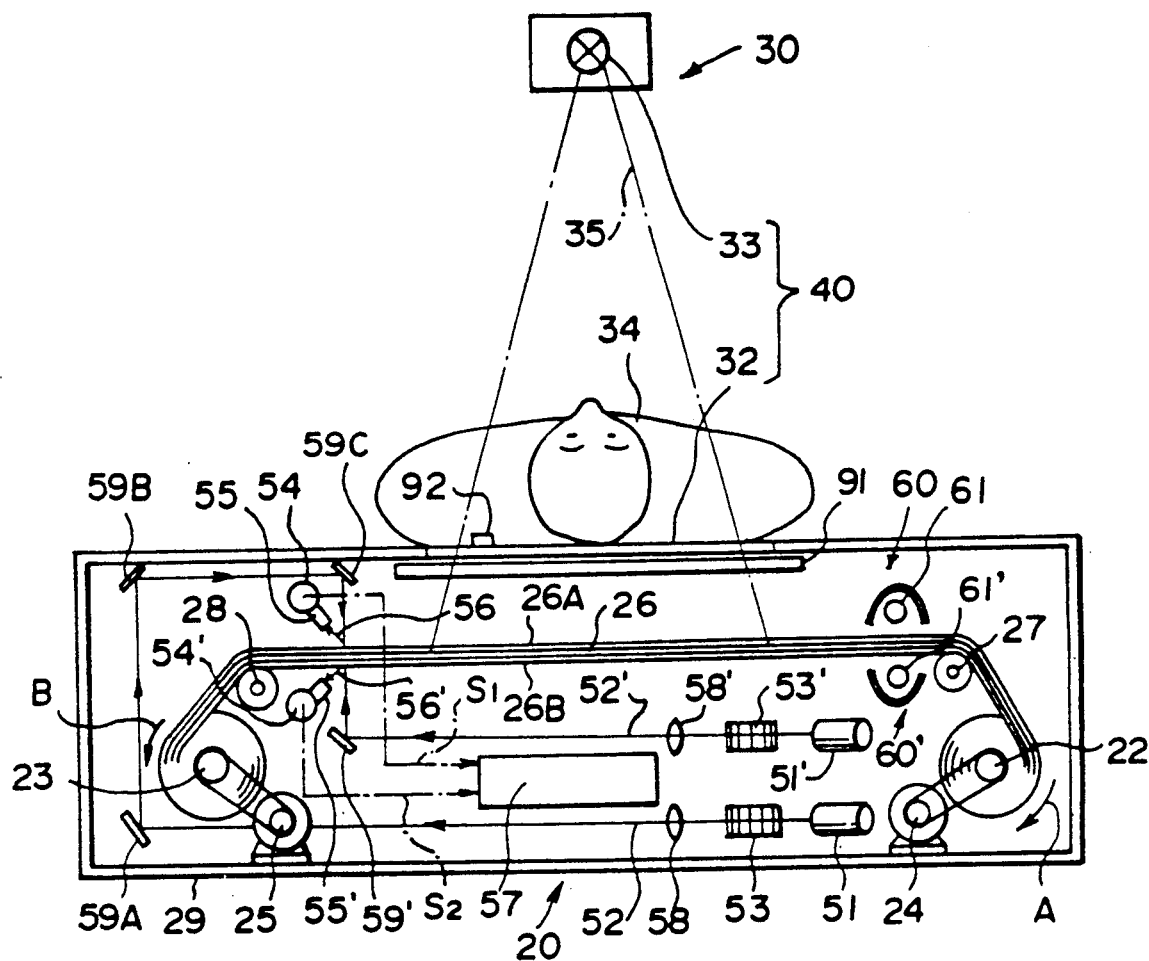
FIG. 1 is a schematic side view showing an embodiment of the first radiation image recording and read-out apparatus in accordance with the present invention.

With reference to FIG. 1, an embodiment of the first radiation image recording and read-out apparatus in accordance with the present invention is constituted of a main body 20 and a radiation source housing section 30. A first wind-up shaft 22 and a second wind-up shaft 23 are parallel and spaced apart from each other in a case 29 of the main body 20. The first wind-up shaft 22 is rotated by a motor 24 in the direction indicated by arrow A, and the second wind-up shaft 23 is rotated by a motor 25 in the direction indicated by arrow B. The first wind-up shaft 22, the second wind-up shaft 23, rollers 27 and 28, which will be described later, and the motors 24 and 25 constitute a belt feed means. A flexible belt 26 is in the form of a long strip having edges. One edge portion of the long strip-shaped flexible belt 26, formed of a thin copper plate, is wound around the first wind-up shaft 22. The other edge portion of the flexible belt 26 is supported on the second wind-up shaft 23. The flexible belt 26 is wound up around the second wind-up shaft 23. Also, the flexible belt 26 is threaded over the rollers 27 and 28 which are provided between the first wind-up shaft 22 and the second wind-up shaft 23.

A first stimulable phosphor layer 26A capable of storing a radiation image thereon is provided on the upper surface of the flexible belt 26, and a second stimulable phosphor layer 26B capable of storing a radiation image thereon is provided on the lower surface of the flexible belt 26.

An image recording table 32 is provided facing the portion of the flexible belt 26 between the rollers 27 and 28. The aforesaid radiation source housing section 30 houses therein a radiation source 33 constituted of an X-ray tube or the like, and the radiation source 33 faces the image recording table 32. When a radiation image of an object 34 is to be recorded, the object 34 (in this case a person) is placed on the image recording table 32, and the radiation source 33 is then activated. As a result, radiation 35 produced by the radiation source 33 and passing through the object 34 is irradiated onto the portion of the flexible belt 26 located between rollers 27 and 28, and a radiation image of the object 34 is stored on the first stimulable phosphor layer 26A provided on the flexible belt 26. Also, the radiation 35 passing through the first stimulable phosphor layer 26A and the flexible belt 26 is irradiated onto the second stimulable phosphor layer 26B provided on the back surface of the flexible belt 26. Therefore, a radiation image of the object 34 is stored on the second stimulable phosphor layer 26B. In this case, because the flexible belt 26 has the effect of converting radiation energy and it is provided between the first stimulable phosphor layer 26A and the second stimulable phosphor layer 26B, the radiation image stored on the first stimulable phosphor layer 26A is made by exposure to radiation containing soft radiation, while the radiation image stored on the second stimulable phosphor layer 26B is made by exposure to radiation free of soft radiation. Accordingly, images of a specific structure, which is part of the object 34, are different on the first stimulable phosphor layer 26A and the second stimulable phosphor layer 26B.

As will be clear from the foregoing, in this embodiment, an image recording section 40 is constituted of the image recording table 32 and the radiation source 33. In this embodiment, a grid 91 for eliminating scattered radiation is provided between the image recording table 32 and the flexible belt 26.

The radiation images stored on the first stimulable phosphor layer 26A and the second stimulable phosphor layer 26B are read out as electric image signals at a first image read-out section and a second image read-out section, respectively. The first image read-out section comprises a laser beam source 51, a light deflector 53, which may be constituted of a polygon mirror or the like, for reflecting and deflecting a laser beam 52 produced as stimulating rays by the laser beam source 51, long mirrors 59A, 59B and 59C for reflecting the deflected laser beam 52 and causing it to one-dimensionally scan the first stimulable phosphor layer 26A provided on the upper surface of the flexible belt 26, and a scanning lens 58 provided between the mirror 59A and the light deflector 53 for converging the laser beam 52 into a small spot having a predetermined diameter at every scanning position on the first stimulable phosphor layer 26A. The first image read-out section also comprises the motor 25 or the motor 24 as a sub-scanning means, which rotates at a predetermined speed and winds up the flexible belt 26, a long photomultiplier 54 acting as a photoelectric read-out means and provided such that a light receiving face of the long photomultiplier 54 extends along a scanning line (main scanning line) of the laser beam 52 on the flexible belt 26, a long light guide member 55 optically coupled with the light receiving face of the long photomultiplier 54, and a filter (not shown) provided between the light guide member 55 and the long photomultiplier 54 for filtering out the stimulating rays and transmitting light emitted by the first stimulable phosphor layer 26A when it is exposed to the stimulating rays. After the radiation image of the object 34 has been stored on the first stimulable phosphor layer 26A in the manner mentioned above, the motor 25 is rotated to move the flexible belt 26 leftward at a predetermined speed. At this time, the second wind-up shaft 23 is rotated and the flexible belt 26 is wound up around the second wind-up shaft 23. Also, a signal representing the load is given by known means to the first wind-up shaft 22 so that the flexible belt 26 is always properly tensioned. As the flexible belt 26 is moved, the laser beam source 51 and the light deflector 53 are activated, and the laser beam 52 scans the first stimulable phosphor layer 26A. As the first stimulable phosphor layer 26A is exposed to the laser beam 52, the exposed portion of the first stimulable phosphor layer 26A emits a light signal 56 carrying information about the radiation image stored on the first stimulable phosphor layer 26A. The emitted light signal 56 enters the light guide member 55 and is efficiently detected by the long photomultiplier 54. Simultaneously with the main scanning of the laser beam 52 carried out in the manner mentioned above, the flexible belt 26 (i.e. the first stimulable phosphor layer 26A) is moved in the sub-scanning direction as mentioned above. Accordingly, the radiation image stored on the first stimulable phosphor layer 26A is two-dimensionally detected. The output S1 of the long photomultiplier 54 is sent to a read-out circuit 57.

On the other hand, the second image read-out section reads out the radiation image stored on the second stimulable phosphor layer 26B. Elements constituting the second image read-out section are basically equivalent to those constituting the first image read-out section, and are therefore numbered with corresponding primed reference numerals in FIG. 1. The sub-scanning means of the first image read-out section is utilized also as the sub-scanning means of the second image read-out section. Specifically, the sub-scanning of a laser beam 52' on the second stimulable phosphor layer 26B is carried out by rotating the motor 25 or the motor 24 to move the flexible belt 26. Also, the second image read-out section is provided with only a single long mirror 59' for reflecting the deflected laser beam 52' toward the second stimulable phosphor layer 26B. The output S2 of a long photomultiplier 54' at the second image read-out section (i.e. the output representing the radiation image stored on the second stimulable phosphor layer 26B) is sent to the read-out circuit 57. The long photomultiplier is described in detail in, for example, Japanese Unexamined Patent Publication No. 62(1987)-16666.

Figure 2:
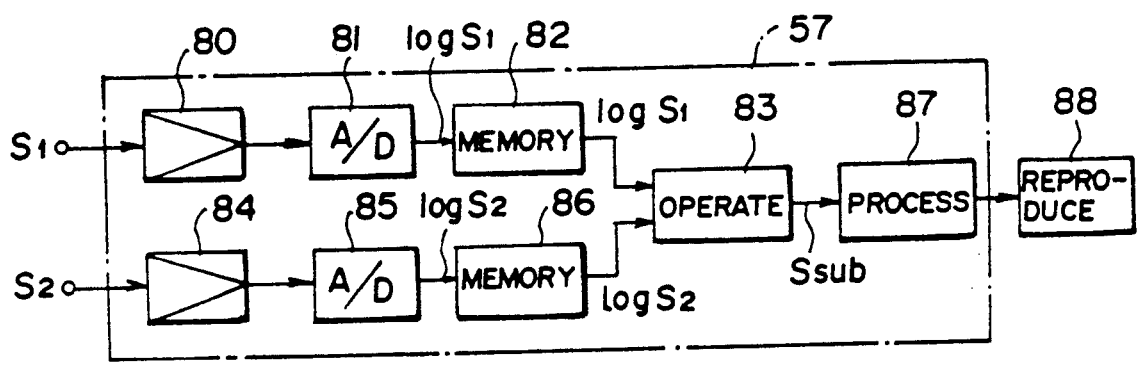
FIG. 2 is a block diagram showing the configuration of circuitry used for radiation image read-out in the embodiment shown in FIG. 1.

Processing in the read-out circuit 57 will hereinbelow be described with reference to FIG. 2. The output S1 of the long photomultiplier 54 is logarithmically amplified by a logarithmic amplifier 80, and is then digitized by an A/D converter 81 into a digital read-out image signal logS1. The digital read-out image signal logS1 in temporarily stored in a frame memory 82, then read therefrom and sent to a subtraction operating circuit 83. Also, the output S2 of the long photomultiplier 54' is logarithmically amplified by a logarithmic amplifier 84 and is then digitized by an A/D converter 85 into a digital read-out image signal logS2. The digital read-out image signal log S2 thus obtained is temporarily stored in a frame memory 86, then read therefrom and sent to the subtraction operating circuit 83.

The subtraction operating circuit 83 weights the image signals logS1 and logS2, and carries out subtraction processing between the corresponding picture elements to calculate a digital difference signal Ssub, expressed as $$Ssub = a \cdot \log S1 - b \cdot \log S2 - c$$

where a and b each denote a weighting coefficient, and c denotes a bias component. The difference signal Ssub is subjected to image processing such as gradation processing or frequency response processing, then sent to an image reproducing apparatus 88 outside of the radiation image recording and read-out apparatus, and used for reproducing a visible radiation image. The image reproducing apparatus 88 may be a display means such as a cathode ray tube (CRT) or a recording apparatus for carrying out light beam scanning recording on a photosensitive film, or may be replaced by an apparatus for storing the image signals in an image file on an optical or magnetic disk.

When the weighting coefficients a and b are adjusted to appropriate values in the course of carrying out the aforesaid subtraction operation, signal components representing portions of the object outside of the specific structure are eliminated in the obtained difference signal Ssub. Therefore, a radiation image representing only the extracted specific structure can be obtained by reproducing a visible image of the difference signal Ssub. In the course of carrying out the subtraction operation, it is necessary for subtraction to be carried out between corresponding picture elements. For this purpose, as shown in FIG. 1 by way of example, a marker 92 may be provided in the vicinity of the object 34, and corresponding picture elements in the image signals logS1 and logS2 may be found by utilizing the signal representing the marker 92 as a reference signal. However, as the positions of the first stimulable phosphor layer 26A and the second stimulable phosphor layer 26B are fixed with respect to each other, the marker 92 need not necessarily be used because the read-out start positions are always fixed.

Instead of sending the read-out image signals logS1 and logS2 to the subtraction operating circuit 83, an ordinary visible radiation image may be reproduced by use of the image signal logS1 or the image signal logS2. For this purpose, the image signal logS1 and the image signal logS2 may be stored in an image file on an optical disk, for example.

The portion of the flexible belt 26A supporting the first stimulable phosphor layer 26A and the second stimulable phosphor layer 26B, the image read-out from which has been finished in the manner described above, is wound up around the second wind-up shaft 23. As a result, a different portion of the flexible belt 26 which was formerly wound around the first wind-up shaft 22 is positioned between the rollers 27 and 28. Therefore, radiation images can be stored on the first stimulable phosphor layer 26A and the second stimulable phosphor layer 26B provided on said different portion of the flexible belt 26 in the same manner described above. Radiation image recording is thus carried out approximately over the overall length of the flexible belt 26, and portions of the flexible belt 26 which were wound around the first wind-up shaft 22 are fed toward the second wind-up shaft 23. Thereafter, the motor 24 is operated, and the first wind-up shaft 22 is rotated in the direction indicated by arrow A. In this manner, flexible belt 26 is rewound around the first wind-up shaft 22. At this time, the flexible belt 26 passes between a first erasing section 60 and a second erasing section 60' provided in the vicinity of the roller 27, and radiation energy remaining on the first stimulable phosphor layer 26A and the second stimulable phosphor layer 26B provided on the flexible belt 26 is released (erased). By way of example, the first erasing section 60 and the second erasing section 60' are constituted respectively of erasing light sources 61 and 61' provided above and below the flexible belt 26 positioned between the rollers 27 and 28. The erasing light sources 61 and 61' are constituted of fluorescent lamps or the like, and mainly produce erasing light having a wavelength within the stimulation wavelength range for the stimulable phosphor. The erasing light sources 61 and 61' are turned on when the flexible belt 26 is rewound around the first wind-up shaft 22. As the first stimulable phosphor layer 26A and the second stimulable phosphor layer 26B are exposed to the erasing light, the radiation energy remaining on the first stimulable phosphor layer 26A and the second stimulable phosphor layer 26B is released therefrom.

In this manner, the flexible belt 26 supporting the first stimulable phosphor layer 26A and the second stimulable phosphor layer 26B, from which layers residual radiation energy has been erased to such an extent that they are reusable for recording a radiation image, is rewound around the first wind-up shaft 22. Therefore, image recording and read-out can be repeated by use of the flexible belt 26. As erasing light sources 61 and 61', tungsten-filament lamps, halogen lamps, infrared ray lamps or xenon flash lamps as disclosed in U.S. Pat. No. 4,400,619 may be used as well as the aforesaid fluorescent lamps. The erasing sections 60 and 60' may also be constituted of surface light sources such as panels each composed of light emitting diodes (LED's) arrayed two-dimensionally or electroluminescence plated (EL plates).

In the aforesaid embodiment, the radiation images stored on the first stimulable phosphor layer 26A and the second stimulable phosphor layer 26B are read out at the image read-out sections immediately after image recording is carried out. However, this embodiment may also be used for repeating the image recording on consecutive portions of the flexible belt 26 prior to image read-out at the image read-out sections. In this case, most of the flexible belt 26 supporting the image-recorded first stimulable phosphor layer 26A and the image-recorded second stimulable phosphor layer 26B is wound up around the second wind-up shaft 23 without carrying out image read-out. After the sequential image recording is thus finished, the flexible belt 26 is rewound around the first wind-up shaft 22, and the image read-out is carried out at the image read-out sections in the course of said rewinding of the flexible belt 26.

Figure 3:
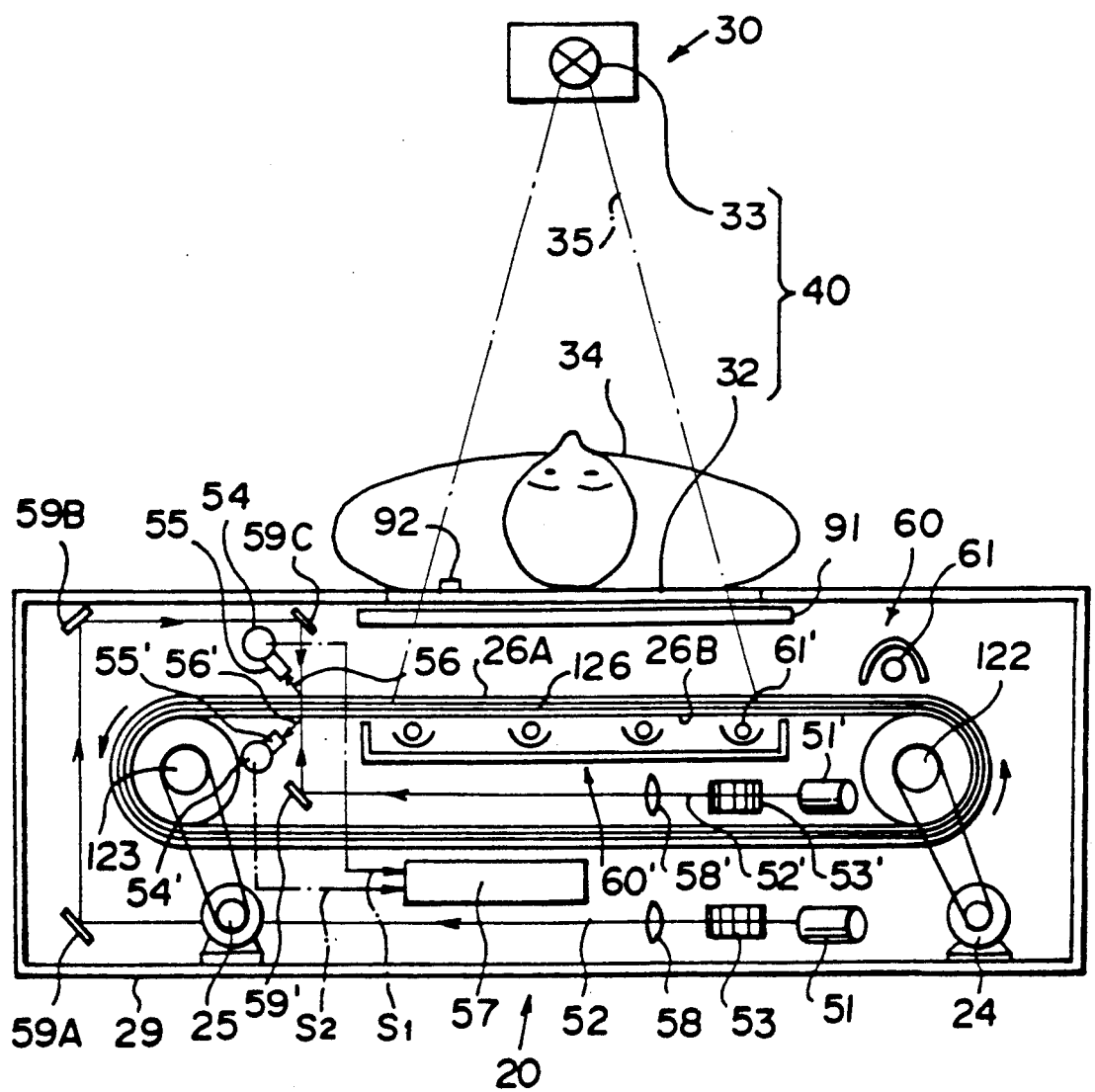
FIG. 3 is a schematic side view showing another embodiment of the first radiation image recording and read-out apparatus in accordance with the present invention.

Another embodiment of the first radiation image recording and read-out apparatus in accordance with the present invention will hereinbelow be described with reference to FIG. 3. In FIG. 3, similar elements are numbered with the same reference numerals with respect to FIG. 1. In this embodiment, an endless belt 126 is applied in an elliptic form around rollers 122 and 123, and the drive roller 123 is rotated by the motor 25 to send a portion of the endless belt 126 sequentially to the image recording section, the image read-out sections and the erasing sections. In this embodiment, the laser beam source 51', the light deflector 53' and other components constituting the second image read-out section for reading out the radiation image from the second stimulable phosphor layer 26B are provided inside of the space defined by the endless belt 126.

In this embodiment, a plurality of erasing light sources 61', 61', . . . constituting the second erasing section 60' are provided inside of the space defined by the endless belt 126, and are turned on when, for example, a portion of the second stimulable phosphor layer 26B capable of storing an image thereon and provided on the endless belt 126 is being positioned for image recording. On the other hand, the erasing light source 61 constituting the first erasing section 60 is kept activated as long as a portion of the first stimulable phosphor layer 26A capable of storing an image thereon and provided on the endless belt 126 is being positioned image recording. In general, image read-out is carried out while a portion of the endless belt is being brought into position for image recording. Therefore, light shielding plates (not shown) or a pair of nip rollers (not shown) are provided to prevent the erasing light produced by the erasing light source 61 from impinging upon the image-recorded portions of the first stimulable phosphor layer 26A and the second stimulable phosphor layer 26B on which the image read-out is to be carried out.

Embodiments of the second radiation image recording and read-out apparatus in accordance with the present invention will be described hereinbelow.

Figure 4:
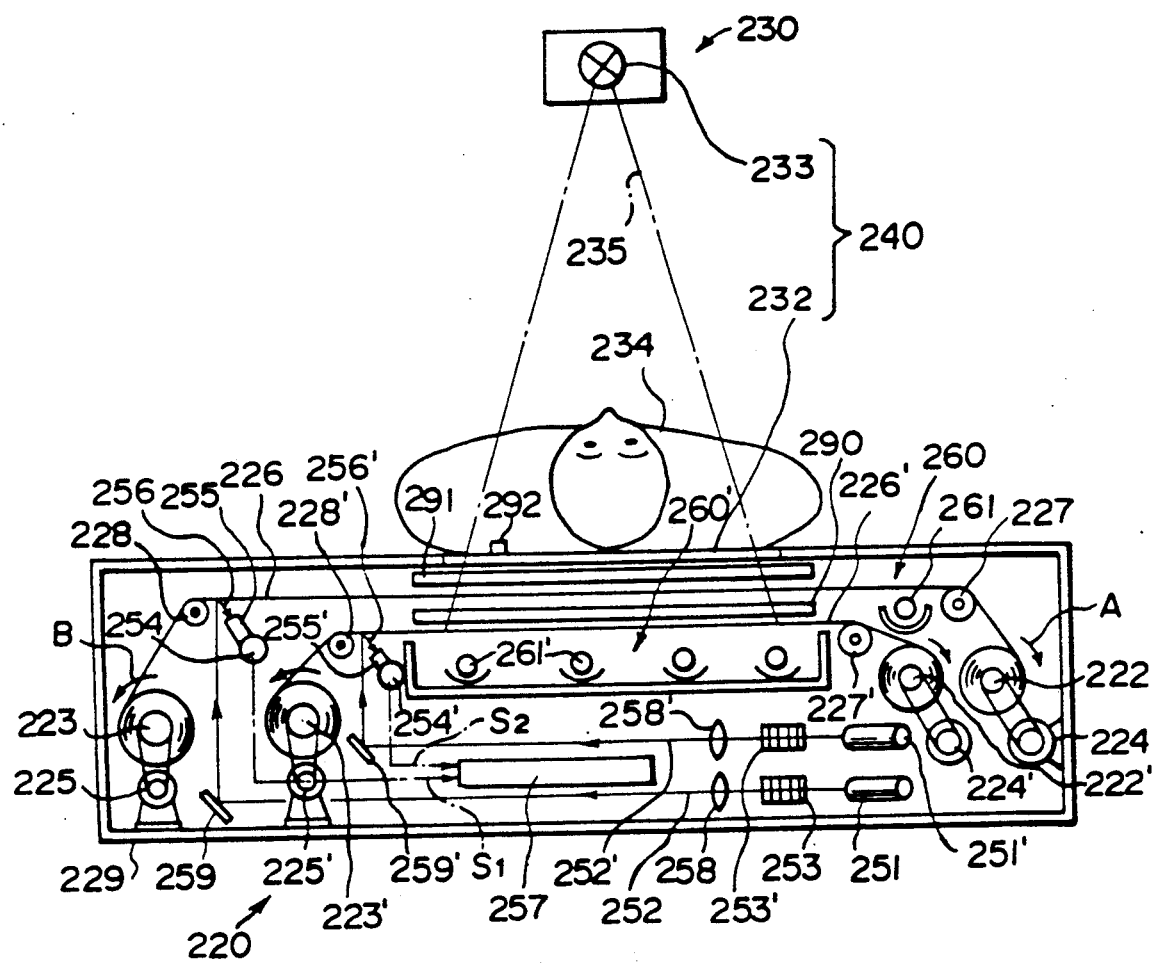
FIG. 4 is a schematic side view showing an embodiment of the second radiation image recording and read-out apparatus in accordance with the present invention.

With reference to FIG. 4, an embodiment of the second radiation image recording and read-out apparatus in accordance with the present invention is constituted of a main body 220 and a radiation source housing section 230. A first wind-up shaft 222 and a second wind-up shaft 223 are parallel and spaced apart from each other in a case 229 of the main body 220. The first wind-up shaft 222 is rotated by a motor 224 in the direction indicated by arrow A, and the second wind-up shaft 223 is rotated by a motor 225 in the direction indicated by arrow B. The first wind-up shaft 222, the second wind-up shaft 223, rollers 227 and 228, which will be described later, and the motors 224 and 225 constitute a first belt feed means. A first stimulable phosphor sheet 226, capable of storing a radiation image thereon, is in the form of a long strip composed of a flexible support, which is substantially permeable to radiation, and a stimulable phosphor layer. One edge portion of the first stimulable phosphor sheet 226 is wound around the first wind-up shaft 222. The other edge portion of the first stimulable phosphor sheet 226 is supported on the second wind-up shaft 223. Also, the first stimulable phosphor sheet 226 is threaded over the rollers 227 and 228 which are provided between the first wind-up shaft 222 and the second wind-up shaft 223. The first stimulable phosphor sheet 226 is provided so that its flexible support substantially permeable to radiation faces up and the stimulable phosphor layer provided on the flexible support faces down.

A radiation energy converting filter 290 constituted of a copper plate is provided below and parallel to the first stimulable phosphor sheet 226. Also, a second stimulable phosphor sheet 226' is applied below the radiation energy converting filter 290 parallel to the portion of the first stimulable phosphor sheet 226 positioned between the rollers 227 and 228. The second stimulable phosphor sheet 226' is of the same type as the first stimulable phosphor sheet 226, and one edge portion and the other edge portion of the second stimulable phosphor sheet 226' are wound around and supported by a third wind-up shaft 222' and a fourth wind-up shaft 223'. The third wind-up shaft 222' is rotated by a motor 224' in the same direction as the first wind-up shaft 222, and the fourth wind-up shaft 223' is rotated by a motor 225' in the same direction as the second wind-up shaft 223. Also, the second stimulable phosphor sheet 226' is threaded over rollers 227' and 228', which together with the wind-up shafts 222', 223' and the motors 224', 225' constitute a second sheet feed means.

An image recording table 232 is provided facing the portion of the first stimulable phosphor sheet 226 positioned between the rollers 227 and 228. The aforesaid radiation source housing section 230 houses therein a radiation source 233 constituted of an X-ray tube or the like, and the radiation source 233 faces the image recording table 232. When a radiation image of an object 234 is to be recorded, the object 234 (in this case a person) is placed on the image recording table 232, and the radiation source 233 is then activated. As a result, radiation 235 produced by the radiation source 233 and passing through the object 234 is irradiated onto the portion of the first stimulable phosphor sheet 226 positioned between the rollers 227 and 228, and a radiation image of the object 234 is stored on the first stimulable phosphor sheet 226 (specifically, on the stimulable phosphor layer provided on the lower surface of the first stimulable phosphor sheet 226). Also, the radiation 235 passing through the first stimulable phosphor sheet 226 is irradiated onto the portion of the second stimulable phosphor sheet 226' positioned between the rollers 227' and 228'. Therefore, a radiation image of the object 234 is also stored on the second stimulable phosphor sheet 226'. In this case, because the radiation energy converting filter 290 is provided between the first stimulable phosphor sheet 226 and the second stimulable phosphor sheet 226', the radiation image stored on the first stimulable phosphor sheet 226 is made by exposure to radiation containing soft radiation, and the radiation image stored on the second stimulable phosphor sheet 226' is made by exposure to radiation free of soft radiation. Accordingly, images of a specific structure, which is part of the object 234, are different on the first stimulable phosphor sheet 226 and the second stimulable phosphor sheet 226'.

As will be clear from the foregoing, in this embodiment, an image recording section 240 is constituted of the image recording table 232 and the radiation source 233. In this embodiment, a grid 291 for eliminating scattered radiation is provided between the image recording table 232 and the first stimulable phosphor sheet 226.

The radiation images stored on the first stimulable phosphor sheet 226 and the second stimulable phosphor sheet 226' are read out as electric image signals at a first image read-out section and a second image read-out section, respectively. The first image read-out section comprises a laser beam source 251, a light deflector 253, which may be constituted of a polygon mirror or the like, for reflecting and deflecting a laser beam 252 produced as stimulating rays by the laser beam source 251, a long mirror 259 for reflecting the deflected laser beam 252 and causing it to one-dimensionally scan the first stimulable phosphor sheet 226 (specifically, the stimulable phosphor layer thereof), and a scanning lens 258 provided between the mirror 259 and the light deflector 253 for converging the laser beam 252 into a small spot having a predetermined diameter at every scanning position on the first stimulable phosphor sheet 226. The first image read-out section also comprises the motors 224 and 225 as wind-up means for the first stimulable phosphor sheet 226 and as a sub-scanning means for moving the first stimulable phosphor sheet 226 at a predetermined speed, a long photomultiplier 254 acting as a photoelectric read-out means and provided so that a light receiving face of the long photomultiplier 254 extends along a scanning line (main scanning line) of the laser beam 252 on the first stimulable phosphor sheet 226, a long light guide member 255 optically coupled with the light receiving face of the long photomultiplier 254, and a filter (not shown) for preventing the laser beam 252 from entering the long photomultiplier 254. After the radiation image of the object 234 has been stored on the first stimulable phosphor sheet 226 in the manner described above, the motor 225 is rotated to move the first stimulable phosphor sheet 226 leftward at a predetermined speed. At this time, the first stimulable phosphor sheet 226 is wound up around the second wind-up shaft 223. Also, a signal representing the load is given by known means to the first wind-up shaft 222 so that the first stimulable phosphor sheet 226 is always properly tensioned. As the first stimulable phosphor sheet 226 is moved, the laser beam source 251 and the light deflector 253 are activated, and the laser beam 252 scans the first stimulable phosphor sheet 226. As the first stimulable phosphor sheet 226 is exposed to the laser beam 252, the exposed portion of the first stimulable phosphor sheet 226 emits a light signal 256 carrying information about the radiation image stored on the first stimulable phosphor sheet 226. The emitted light signal 256 enters the light guide member 255 and is efficiently detected by the long photomultiplier 254. Simultaneously with the main scanning of the laser beam 252 carried out in the manner mentioned above, the first stimulable phosphor sheet 226 is moved in the sub-scanning direction as mentioned above. Accordingly, the emitted light signal 256 represents the two-dimensional image stored on the first stimulable phosphor sheet 226. The output S1 of the long photomultiplier 254 is sent to a read-out circuit 257.

On the other hand, the second image read-out section reads out the radiation image stored on the second stimulable phosphor sheet 226'. Elements constituting the second image read-out section are basically equivalent to those constituting the first image read-out section, and are therefore numbered with corresponding primed reference numerals in FIG. 4. The output S2 of a long photomultiplier 254' at the second image read-out section (i.e. the output representing the radiation image stored on the second stimulable phosphor sheet 226') is sent to the read-out circuit 257. The long photomultiplier is described in detail in, for example, Japanese Unexamined Patent Publication No. 62(1987)-16666.

Processing in the read-out circuit 257 is carried out in the same manner as processing in the read-out circuit 57 mentioned above with reference to FIG. 2. In FIG. 4, reference numeral 292 denotes a marker acting in the same manner as the marker 92 shown in FIG. 1.

The portion of the first stimulable phosphor sheet 226, from which the image has already been read out in the manner described above, is wound up around the second wind-up shaft 223. As a result, a different portion of the first stimulable phosphor sheet 226 which has been wound around the first wind-up shaft 222 is positioned between the rollers 227 and 228. Therefore, a radiation image can be stored on said different portion of the first stimulable phosphor sheet 226 in the same manner as mentioned above. Radiation image recording is thus carried out approximately over the overall length of the first stimulable phosphor sheet 226, and the overall first stimulable phosphor sheet 226 which was wound around the first wind-up shaft 222 is fed toward the second wind-up shaft 223. Thereafter, the motor 224 is operated, and the first wind-up shaft 222 is rotated in the direction indicated by arrow A. In this manner, the overall first stimulable phosphor sheet 226, which is wound around the second wind-up shaft 223 and on which the image read-out process has been finished, is returned to the first wind-up shaft 222. At this time, the first stimulable phosphor sheet 226 passes over a first erasing section 260 provided in the vicinity of the roller 227, and radiation energy remaining on the first stimulable phosphor sheet 226 is released (erased). By way of example, the first erasing section 260 is constituted of an erasing light source 261 provided below the first stimulable phosphor sheet 226 applied between the rollers 227 and 228. The erasing light source 261 is constituted of a fluorescent lamp or the like, and mainly produces erasing light having a wavelength within the stimulation wavelength range for the stimulable phosphor of the first stimulable phosphor sheet 226. The erasing light source 261 is turned on when the first stimulable phosphor sheet 226 is rewound around the first wind-up shaft 222. As the first stimulable phosphor sheet 226 is exposed to the erasing light, the radiation energy remaining on the first stimulable phosphor sheet 226 after the image read-out process has been finished is released therefrom.

Winding-back and erasing of the sheet are also carried out in the same manner as described above for the second stimulable phosphor sheet 226'. A second erasing section 260' for carrying out erasing of the second stimulable phosphor sheet 226' is constituted of a plurality of erasing light sources 261', 261', . . . provided below the portion of the second stimulable phosphor sheet 226' positioned between the rollers 227' and 228'.

In this manner, the first stimulable phosphor sheet 226 and the second stimulable phosphor sheet 226', from which sheets the residual radiation energy has been erased to such an extent that they are reusable for recording a radiation image, are rewound around the first wind-up shaft 222 and the third wind-up shaft 222', respectively. Therefore, image recording and read-out can be repeated by use of the first stimulable phosphor sheet 226 and the second stimulable phosphor sheet 226'. As the erasing light source 261 and the erasing light sources 61', 61', . . . , tungsten-filament lamps, halogen lamps, infrared ray lamps or xenon flash lamps as disclosed in U.S. Pat. No. 4,400,619 may be used as well as the aforesaid fluorescent lamps. The erasing sections 260 and 260' may also be constituted of surface light sources such as panels each composed of light emitting diodes (LED's) arrayed two-dimensionally or electroluminescence plates (EL plates).

In the aforesaid embodiment shown in FIG. 4, the radiation images stored on the first stimulable phosphor sheet 226 and the second stimulable phosphor sheet 226' are read out at the image read-out sections immediately after the image recording is carried out. However, the second radiation image recording and read-out apparatus in accordance with the present invention may also be used for repeating image recording on consecutive portions of the phosphor sheets prior to image read-out at the image read-out sections. In this case, the image-recorded portions of the first stimulable phosphor sheet 226 and the second stimulable phosphor sheet 226' are wound up around the second wind-up shaft 223 and the fourth wind-up shaft 223' respectively before carrying out the image read-out process. After the sequential recording of images is thus finished, the first stimulable phosphor sheet 226 and the second stimulable phosphor sheet 226' are returned from the second wind-up shaft 223 to the first wind-up shaft 222 and from the fourth wind-up shaft 223' to the third wind-up shaft 222', respectively, and image read-out is carried out at the image read-out sections in the course of said returning of the first stimulable phosphor sheet 226 and the second stimulable phosphor sheet 226'.

Figure 5:
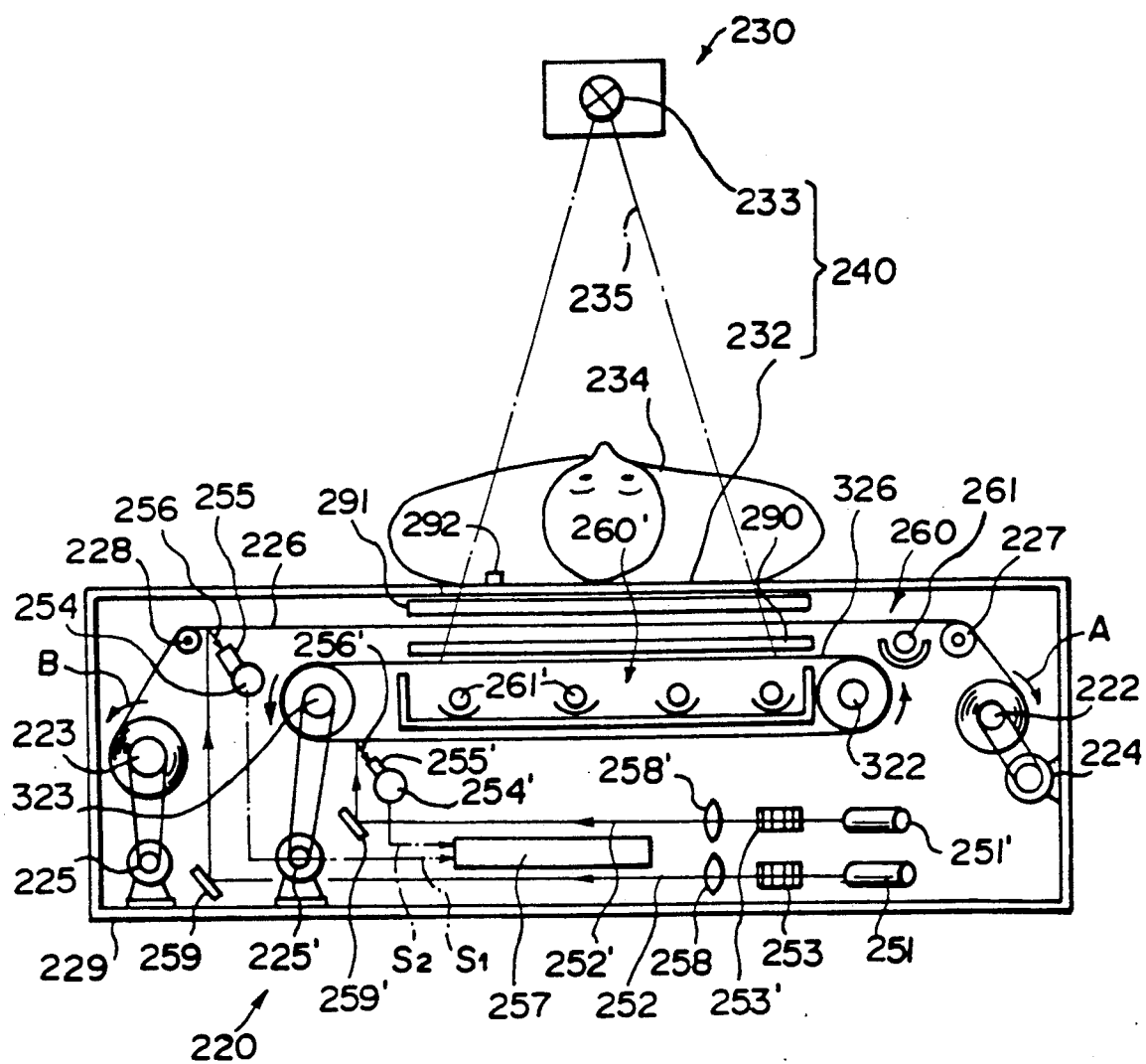
FIG. 5 is a schematic side view showing another embodiment of the second radiation image recording and read-out apparatus in accordance with the present invention.

Another embodiment of the second radiation image recording and read-out apparatus in accordance with the present invention will hereinbelow be described with reference to FIG. 5. In FIG. 5, similar elements are numbered with the same reference numerals with respect to FIG. 4. In this embodiment, a second stimulable phosphor sheet 326 is constituted in an endless belt form, and is mounted over rollers 322 and 323. The drive roller 323 is rotated by the motor 225' to sequentially send portions of the second stimulable phosphor sheet 326 to the image recording section, the image read-out section and the erasing section. In this embodiment, the second stimulable phosphor sheet 326 is composed of the endless belt-shaped support with the stimulable phosphor layer provided on the outer surface of a support, and a laser beam 252', serving as the stimulating rays, is irradiated onto the outer surface of the second stimulable phosphor sheet 326.

In the embodiment shown in FIG. 5 wherein the erasing light sources 261', 261', . . . are provided inside of the space defined by the second stimulable phosphor sheet 326, the support of the second stimulable phosphor sheet 326 is composed of a transparent material so that the erasing light produced by the erasing light sources 261', 261', . . . is irradiated onto the stimulable phosphor layer of the second stimulable phosphor sheet 326. Also, since the second stimulable phosphor sheet 326 is moved in one direction, the erasing light sources 261', 261', . . . are turned on when, for example, the image-recorded portion of the second stimulable phosphor sheet 326 is being positioned for exposure to radiation.

Conversely to the embodiment shown in FIG. 5, the first stimulable phosphor sheet may be constituted in a comparatively large endless belt form, and a second stimulable phosphor sheet in the form of a long strip having edges may be provided inwardly from the first stimulable phosphor sheet. It is also possible to provide an endless belt-shaped second stimulable phosphor sheet inwardly from the endless belt-shaped first stimulable phosphor sheet.

Embodiments of the third radiation image recording and read-out apparatus in accordance with the present invention will be described hereinbelow.

Figure 6A:
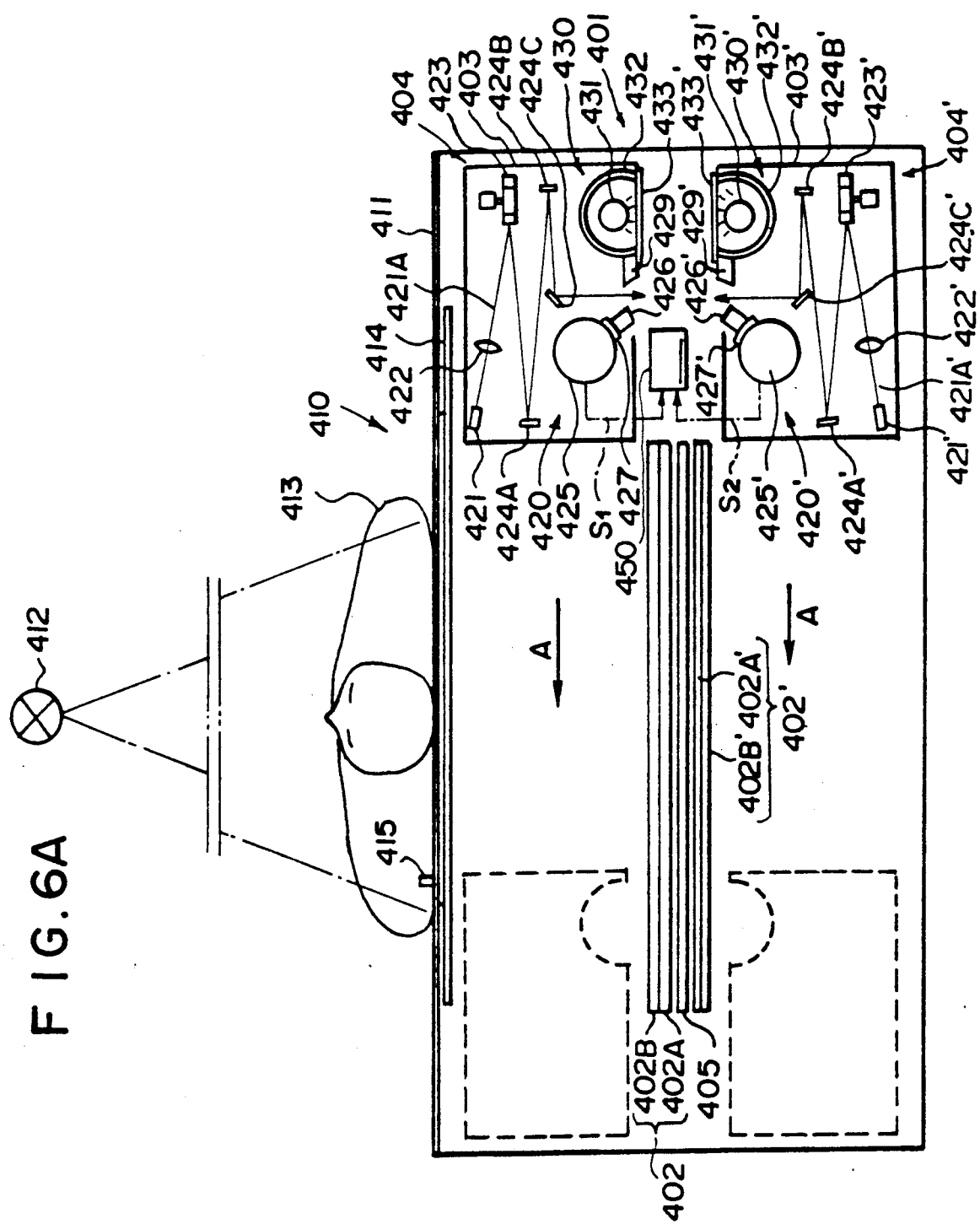
FIGS. 6A and 6B are schematic side views showing an embodiment of the third radiation image recording and read-out apparatus in accordance with the present invention.
Figure 6B:
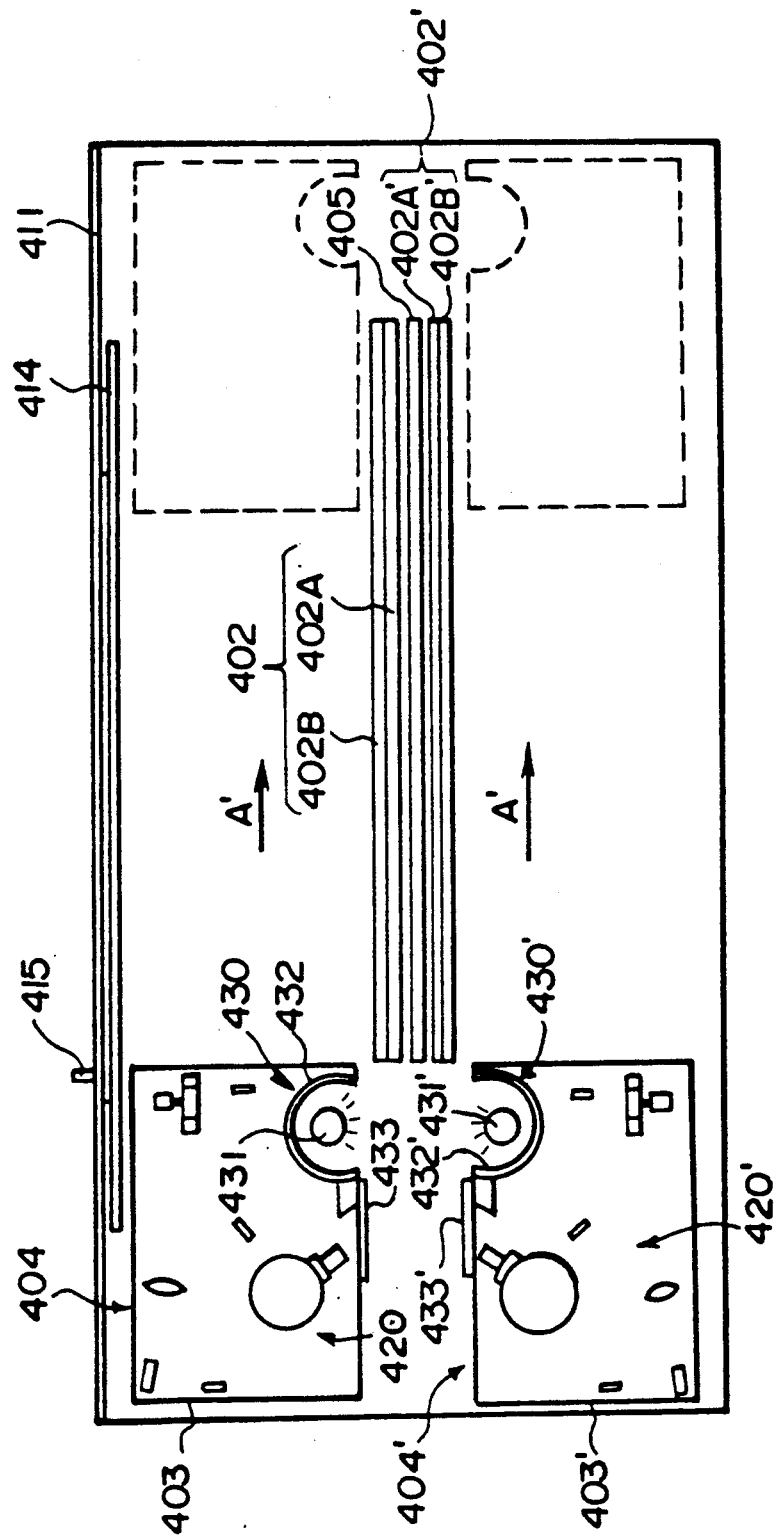

With reference to FIGS. 6A and 6B, an embodiment of the third radiation image recording and read-out apparatus in accordance with the present invention comprises an apparatus body 401 and a radiation source 412, such as an X-ray source or the like, disposed above an image recording table 411 constituting an upper surface of the apparatus body 401. In the apparatus body 401, a first stimulable phosphor sheet 402 and a second stimulable phosphor sheet 402' are parallel and lie close to each other below the image recording table 411. The first stimulable phosphor sheet 402 comprises a radiation-permeable substrate 402A and a first stimulable phosphor layer 402B overlaid on the upper surface of the substrate 402A. The second stimulable phosphor sheet 402' comprises a radiation-permeable substrate 402A' and a second stimulable phosphor layer 402B' overlaid on the lower surface of the substrate 402A. Also, a radiation energy converting filter 405 constituted of a copper plate or the like is provided between the first stimulable phosphor sheet 402 and the second stimulable phosphor sheet 402'.

In this embodiment, an image recording means 410 is constituted by the radiation source 412 and the image recording table 411. Also, a grid 414 for elimination of scattered radiation is secured to the lower surface of the image recording table 411.

A first read-out and erasing unit 404, comprising a case 403, a first image read-out means 420 and a first erasing means 430 integrally housed close to each other in the case 403 to form a single unit, is provided above the first stimulable phosphor sheet 402. Also, a second read-out and erasing unit 404', comprising a case 403', a second image read-out means 420' and a second erasing means 430' integrally housed close to each other in the case 403' to form a single unit, is provided below the second stimulable phosphor sheet 402. The first read-out and erasing unit 404 and the second read-out and erasing unit 404' are reciprocally moveable while facing the first stimulable phosphor sheet 402 and the second stimulable phosphor sheet 402', respectively, between the right end position (first position) as indicated by the solid line in FIG. 6A and the left end position (second position) as indicated by the solid line in FIG. 6B. In this embodiment, movement in the direction indicated by arrow A from the first position to the second position is referred to as forward movement, and movement in the direction indicated by arrow A' from the second position to the first position is referred to as backward movement. As shown in FIG. 7 by way of example, a first unit movement means 440 for reciprocally moving the first read-out and erasing unit 404 is composed of a screw rod 441 extending in the direction of movement of the first read-out and erasing unit 404, unit supporting members 442, 442 engaged with the screw rod 441, a gear 444 secured to the screw rod 441, a gear 443 meshing with the gear 444, and a motor 445 for rotating the gear 443 in the forward and reverse directions. The screw rod 441 is rotated by the motor 445 via the gears 443 and 444, thereby to move the unit supporting members 442, 442 and carry out reciprocal movement of the first read-out and erasing unit 404. Also, a second unit movement means 440' for reciprocally moving the second read-out and erasing unit 404' is composed of a screw rod 441' extending in the direction of movement of the second read-out and erasing unit 404', unit supporting members 442', 442' engaged with the screw rod 441', a gear 444' secured to the screw rod 441', a gear 443' meshing with the gear 444', and a motor 445' for rotating the gear 443' in the forward and reverse directions. The screw rod 441' is rotated by the motor 445' via the gears 443' and 444', thereby to move the unit supporting members 442', 442' and carry out reciprocal movement of the second read-out and erasing unit 404'.

In the case where the first unit movement means 440 and the second unit movement means 440' are provided independently of each other, they can be moved at different speeds. However, in the case where the first unit movement means 440 and the second unit movement means 440' may be moved at equal speeds in the same direction, they may be combined into a single unit movement means, and the first read-out and erasing unit 404 and the second read-out and erasing unit 404' may be coupled and moved together by the single unit movement means.

When an object is placed on the image recording table 411 with the first read-out and erasing unit 404 and the second read-out and erasing unit 404' being present at their first positions, the radiation source 412 is activated. As a result, radiation passing through an object 413 (in this case a person, lying, for example, on his back) is irradiated onto the first stimulable phosphor sheet 402, and a radiation image of the object 413 is stored on the first stimulable phosphor layer 402B of the first stimulable phosphor sheet 402. Also, the radiation passing through the first stimulable phosphor sheet 402 and the radiation energy converting filter 405 is irradiated onto the second stimulable phosphor sheet 402' provided below the radiation energy converting filter 405. Therefore, a radiation image of the object 413 is stored on the second stimulable phosphor layer 402B' of the second stimulable sheet 402'. In this case, as the radiation energy converting filter 405 is provided between the first stimulable phosphor layer 402B and the second stimulable phosphor layer 402B', the radiation image stored on the first stimulable phosphor layer 402B is made by exposure to radiation containing soft radiation, and the radiation image stored on the second stimulable phosphor layer 402B' is made by exposure to radiation free of soft radiation. Accordingly, images of a specific structure, which is part of the object 413, are different on the first stimulable phosphor layer 402B and the second stimulable phosphor layer 402B'.

After the image recording process is finished in the manner mentioned above, the radiation images stored on the first stimulable phosphor layer 402B and the second stimulable phosphor layer 402B' are read out as electric image signals respectively by a first image read-out means 420 in the first read-out and erasing unit 404 and a second image read-out means 420' in the second read-out and erasing unit 404'.

The first image read-out means 420 is provided with a stimulating ray irradiation means which comprises a stimulating ray source 421, such as a semiconductor laser or the like, a condensing lens 422 disposed in the optical path of stimulating rays 421A produced by the stimulating ray source 421, a rotating polygon mirror 423 as a light deflector for deflecting the stimulating rays 421A passing through the condensing lens 422, thereby to scan the stimulating rays 421A in a main scanning direction on the first stimulable phosphor layer 402B, and mirrors 424A, 424B and 424C for changing the direction of the optical path of the stimulating rays 421A. The stimulating ray irradiation means makes the stimulating rays 421A repeatedly scan the first stimulable phosphor layer 402B in the main scanning direction. On the other hand, simultaneously with the scanning of the stimulating rays 421A in the main scanning direction, the first read-out and erasing unit 404 is conveyed by the first unit movement means 440 at a predetermined speed in the direction indicated by arrow A. As a result, the scanning position of the stimulating rays 421A is moved in the direction indicated by arrow A, i.e. in the sub-scanning direction, and almost the overall surface of the first stimulable phosphor layer 402B is exposed to the stimulating rays 421A. As the first stimulable phosphor layer 402B is exposed to the stimulating rays 421A, the exposed portion of the first stimulable phosphor layer 402B emits light in proportion to the stored radiation energy, and the emitted light is detected by a photoelectric read-out means in the first image read-out means 420.

The photoelectric read-out means comprises a long photomultiplier 425 extending in the main scanning direction at least over the length of the main scanning line, a filter 427 in close contact with the light receiving face of the photomultiplier 425 for selectively transmitting only the light emitted by the first stimulable phosphor layer 402B and preventing entry of the stimulating rays 421A reflected by the surface of the first stimulable phosphor layer 402B to the photomultiplier 425, and a light guide member 426 in close contact with the light input face of the photomultiplier 425 via the filter 427 for substantially guiding the light emitted by the first stimulable phosphor layer 402B to the photomultiplier 425. Also, a mirror 429 is disposed so as to efficiently reflect the light, which is emitted by the first stimulable phosphor layer 402B toward the mirror 429, to the light receiving face of the light guide member 426. The light emitted by the first stimulable phosphor layer 402B is guided by the light guide member 426 and detected by the photomultiplier 425. The output S1 of the photomultiplier 425 is sent to a read-out circuit 450.

On the other hand, simultaneously with image read-out from the first stimulable phosphor layer 402B carried out as described above, the second read-out and erasing unit 404' is moved in the direction indicated by arrow A, and the radiation image stored on the second stimulable phosphor layer 402B' is read out by a second image read-out means 420' in the second read-out and erasing unit 404'. Elements constituting the second image read-out means 420' are the same as those constituting the first image read-out means 420, and are therefore numbered with corresponding primed reference numerals.

The output S2 of a photomultiplier 425' of the second image read-out means 420' (i.e. the output representing the radiation image stored on the second stimulable phosphor layer 402B') is sent to the read-out circuit 450. The long photomultiplier is described in detail in, for example, Japanese Unexamined Patent Publication No. 62(1987)-16666.

Processing in the read-out circuit 450 is carried out in the same manner as processing in the read-out circuit 57 mentioned above with reference to FIG. 2. In the course of carrying out the subtraction operation process, it is necessary for subtraction to be carried out between corresponding picture elements. For this purpose, as shown in FIG. 6A by way of example, a marker 415 may be provided in the vicinity of the object 413, and corresponding picture elements in the image signals logS1 and logS2 may be found by utilizing the signal representing the marker 415 as a reference signal. However, as the positions of the first stimulable phosphor layer 402B and the second stimulable phosphor layer 402B' are fixed, the marker 415 need not necessarily be used because the read-out start positions are always fixed.

When the image read-out process has been finished in the manner mentioned above, as shown in FIG. 6B, the first read-out and erasing unit 404 and the second read-out and erasing unit 404' are conveyed in the directions indicated by arrows A', A' from their second positions to their first positions, and as units 404 and 404' are conveyed the overall surfaces of the first stimulable phosphor layer 402B and the second stimulable phosphor layer 402B' are exposed to erasing light produced by the first erasing means 430 and the second erasing means 430' in the first read-out and erasing unit 404 and the second read-out and erasing unit 404'. By way of example, the first erasing means 430 is provided with an erasing light source 431, such as a fluorescent lamp or the like, which extends in the main scanning direction, and a reflection plate 432 for reflecting the erasing light, that is radiated upward by the erasing light source 431, toward the surface of the first stimulable phosphor sheet 402. Also, in this embodiment, the erasing light source 431 is always turned on. Therefore, a moveable shutter 433 is disposed above the erasing light source 431 as shown in FIG. 6A to shield the erasing light at the time image recording and image read-out are carried out, and is retracted to a position above the photomultiplier 425 as shown in FIG. 6B to lay bare the erasing light source 431 only when erasing is to be carried out. The moveable shutter 433 need not necessarily be provided in cases where the erasing light source 431 is turned on only when erasing is to be carried out, and is otherwise turned off. As the first read-out and erasing unit 404 is moved in the direction indicated by arrow A', the erasing light source 431 irradiates erasing light over the overall surface of the first stimulable phosphor layer 402B. The erasing light source 431 mainly produces light having a wavelength within the stimulation wavelength range of the first stimulable phosphor layer 402B, and radiation energy remaining on the first stimulable phosphor layer 402B after the image read-out process thereon is carried out is released from the first stimulable phosphor layer 402B when it is exposed to the erasing light. Also, the overall surface of the second stimulable phosphor layer 402B' is erased by the second erasing means 430' having the same configuration as the first erasing means 430. Similar elements of the second erasing means 430 are numbered with corresponding primed reference numerals with respect to the first erasing means 430. The first stimulable phosphor sheet 402 and the second stimulable phosphor sheet 402', having the first stimulable phosphor layer 402B and the second stimulable phosphor layer 402B' respectively erased in the manner mentioned above, can be reused for image recording with the image recording means, and the first read-out and erasing unit 404 and the second read-out and erasing unit 404' are returned to their first positions.

With this embodiment wherein the first read-out and erasing unit 404 and the second read-out and erasing unit 404' are provided so as to move reciprocally while facing the first stimulable phosphor sheet 402 and the second stimulable phosphor sheet 402' fixed at the image recording position, image read-out and erasing can be carried out simultaneously on the first stimulable phosphor sheet 402 and the second stimulable phosphor sheet 402', and subtraction processing can thus be carried out efficiently. Also, with this embodiment, the first read-out and erasing unit 404 and the second read-out and erasing unit 404' are reciprocally moved over the first stimulable phosphor sheet 402 and the second stimulable phosphor sheet 402', which each have a size nearly equal to a single image area. Therefore, the size of the overall apparatus can be reduced to a value nearly equal to the size of a single stimulable phosphor sheet, and the apparatus can be made small. Instead of reciprocally moving the first read-out and erasing unit 404 and second read-out and erasing unit 404' together at equal speeds, they may be moved at different speeds suitable for the first stimulable phosphor sheet 402 and the second stimulable phosphor sheet 402'. Also, the thickness of each of the first stimulable phosphor layer 402B of the first stimulable phosphor sheet 402 and the second stimulable phosphor layer 402B' of the second stimulable phosphor sheet 402', and the kind of stimulable phosphor used may be selected as necessary. For example, in order to reduce noise, the thickness of the second stimulable phosphor layer 402B' may be selected to be larger than the thickness of the first stimulable phosphor layer 402B.

Figure 8:
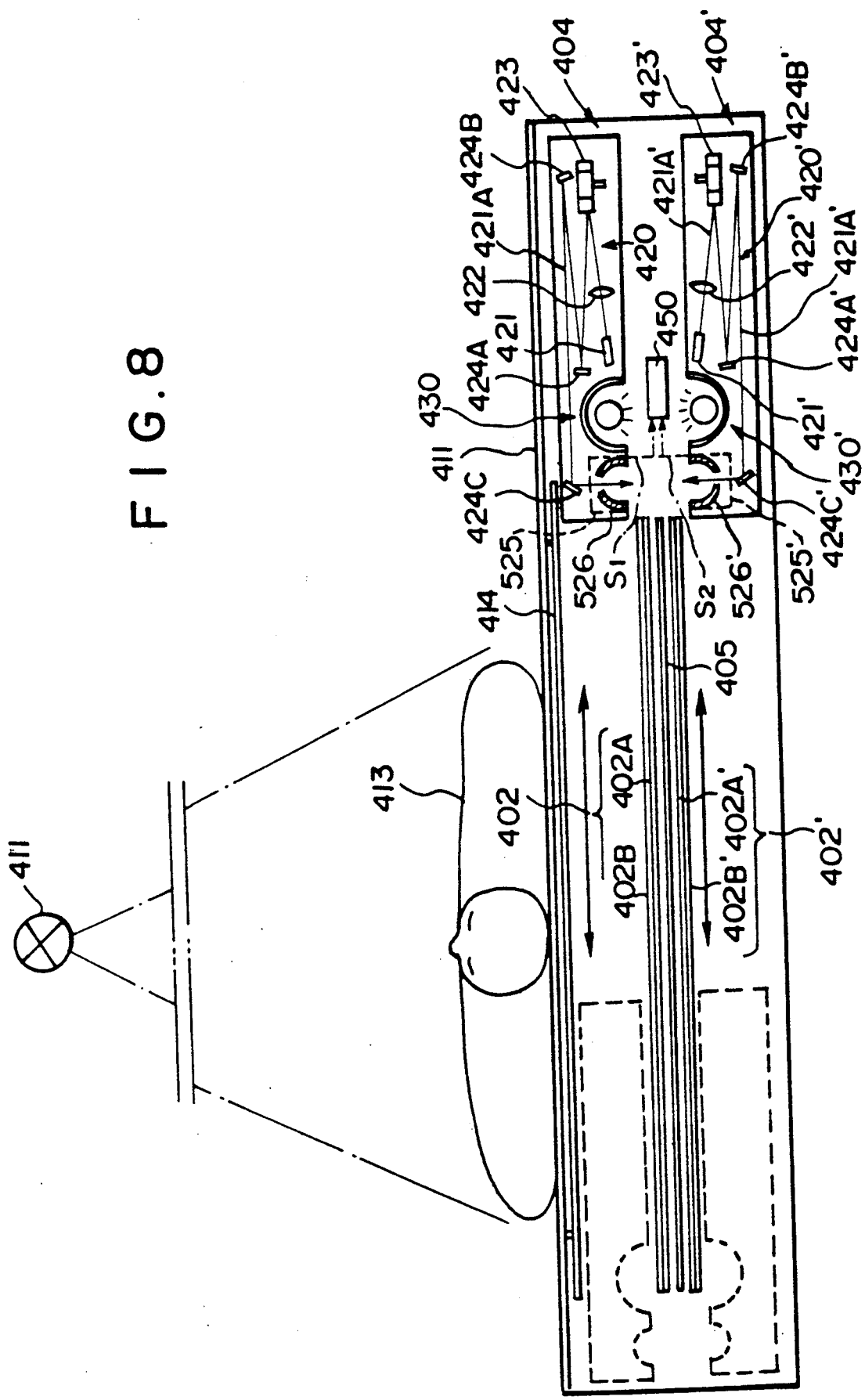
FIG. 8 is a schematic side view showing another embodiment of the third radiation image recording and read-out apparatus in accordance with the present invention.

Another embodiment of the third radiation image recording and read-out apparatus in accordance with the present invention will be described hereinbelow with reference to FIG. 8. In FIG. 8, similar elements are numbered with corresponding reference numerals with respect to FIG. 6A. In this embodiment, the configurations of the photoelectric read-out means in the first read-out and erasing unit 404 and the second read-out and erasing unit 404' are different from those in the embodiment shown in FIG. 6A.

The first read-out and erasing unit 404 and the second read-out and erasing unit 404' are reciprocally moved in the directions indicated by the arrows by a unit movement means of the same type as the aforesaid unit movement means. The optical path of the stimulating rays 421A in the first read-out and erasing unit 404 is substantially horizontal most of the time as will be described later. The optical path of the stimulating rays 421A' in the second read-out and erasing unit 404' is also substantially horizontal most of the time as will be described later. These configurations of the optical paths of the stimulating rays 421A and 421A' are advantageous for decreasing the height of the apparatus body, though the length thereof in the horizontal direction becomes slightly longer because of this configuration.

In the embodiment shown in FIG. 8, a fluorescent light guide member 526 fabricated by forming a sheet material containing a phosphor with photodetectors 525, 525 (only one of the photodetectors 525, 525 is shown in FIG. 8) is used as the photoelectric read-out means in the first read-out and erasing unit 404. Also, a fluorescent light guide member 526' fabricated by forming a sheet material containing a phosphor with photodetectors 525', 525' (only one of the photodetectors 525', 525' is shown in FIG. 8) is used as the photoelectric read-out means in the second read-out and erasing unit 404'. The configurations of the photoelectric read-out means in the first read-out and erasing unit 404 and the second read-out and erasing unit 404' are the same. Therefore, the configuration of only the photoelectric read-out means in the first read-out and erasing unit 404 will hereinbelow be described with reference to FIGS. 9A and 9B.

Figure 9A:
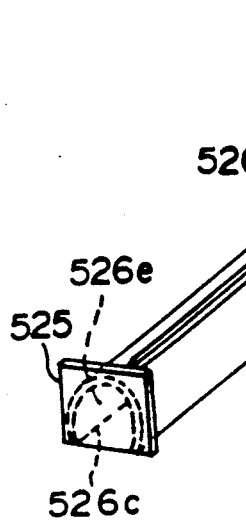
FIGS. 9A and 9B are a perspective view and a sectional view showing the photoelectric read-out means utilizing a fluorescent light guide member.
Figure 9B:
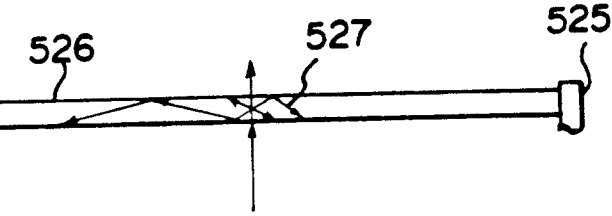

FIG. 9A is a perspective view and FIG. 9B is a sectional view. Both views show the photoelectric read-out means. With reference to FIGS. 9A and 9B, when light is irradiated to the surface of the fluorescent light guide member 526, the phosphor contained in the fluorescent light guide member is stimulated by the light to radiate fluorescence 527. The fluorescence 527 advances to the end faces of the light guide member by repeatedly undergoing total reflection. Therefore, fluorescence having a high intensity is radiated from the end faces of the fluorescent light guide member 526 in such a way that the energy of the light irradiated onto the sheet surface is condensed. Accordingly, when the light emitted by the first stimulable phosphor layer 402B in proportion to the stored radiation energy is made to impinge upon the surface of the fluorescent light guide member 526, the optical amount of the fluorescence 527 thus radiated is proportional to the optical amount of the light emitted by the first stimulable phosphor layer 402B, and therefore the optical amount of the light emitted by the first stimulable phosphor layer 402B can be detected indirectly by bringing the photodetectors 525, 525 into close contact with the end faces of the fluorescent light guide member 526 and detecting the optical amount of the fluorescence 527. Also, the light receiving surfaces of the photodetectors 525, 525 may be small, and therefore read-out image signals can be obtained with a high signal-to-noise ratio. Accordingly, in this embodiment, the fluorescent light guide member 526 is formed in an approximately semicylindrical shape, and a slit 526a through which the stimulating rays 421A are to be passed is formed at the upper part of the fluorescent light guide member 526. The fluorescent light guide member 526 extends in the main scanning direction so that the slit 526a is disposed along and above the main scanning position of the stimulating rays 421A. In this manner, the first stimulable phosphor layer 402B is scanned by the stimulating rays 421A, and the light emitted by the first stimulable phosphor layer 402B is received by an inner surface 526e of the fluorescent light guide member 526. By way of example, the fluorescent light guide member 526 in this embodiment is selected so that it radiates fluorescence primarily having a wavelength of 500 nm upon receiving light primarily having a wavelength of approximately 400 nm emitted by the first stimulable phosphor layer 402B. As such a fluorescent light guide member, a product comprising a sheet-shaped plastic material and an organic phosphor dispersed therein is supplied by Bayer Japan under the trade name LISA-PLASTIC. Also, the photodetectors 525, 525 are placed so as to be in close contact with either end face of the fluorescent light guide member 526 for detecting the fluorescence. The outputs of the photodetectors 525, 525 are added together and sent to the read-out circuit 450. By way of example, the photodetectors 525, 525 may be constituted of CCD type solid state semiconductor devices. In general, the spectral sensitivity of the photodetectors 525, 525 constituted of CCD type solid state semiconductor devices deteriorates for short wavelengths. However, with the fluorescent light guide member 526, light primarily having a wavelength of approximately 400 nm emitted by the first stimulable phosphor layer 402B is wavelength-converted to fluorescence primarily having a wavelength of 500 nm, and therefore the light emitted by the first stimulable phosphor layer 402B can be detected with a high sensitivity by the photodetectors 525, 525. A filter for transmitting the fluorescence radiated by the fluorescent light guide member 526 and intercepting the stimulating rays 421A reflected by the first stimulable phosphor sheet 402 should preferably be provided between each end face of the fluorescent light guide member 526 and each photodetector 525. The phosphor contained in the fluorescent light guide member 526 may be, for example, an organic phosphor such as a coumarin derivative, a thioxanthene derivative, a perylene derivative, or a phorone complex as disclosed in Japanese Unexamined Patent Publication No. 56(1981)-36549, 56(1981)-104987, 58(1983)-111886 or 59(1984)-89302.

Figure 10A:
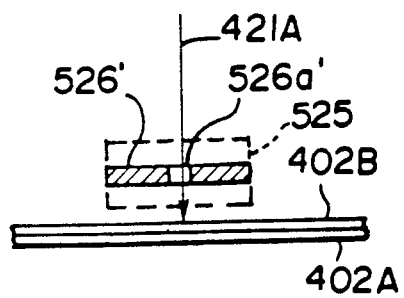
FIGS. 10A and 10B are sectional views showing examples of how the fluorescent light guide member may be provided.
Figure 10B:
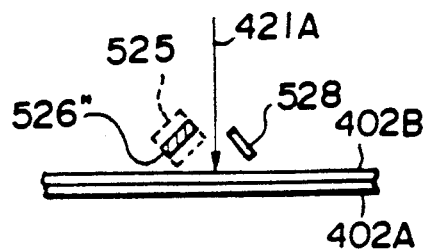

The shape and the layout of the fluorescent light guide member are not limited to those described in the aforesaid embodiment, and any shape and any layout may be employed as long as the surface of the fluorescent light guide member extends along the main scanning line and the light emitted by the position being scanned can be detected. For example, as shown in FIG. 10A, an elongated rectangular fluorescent light guide member 526' having a slit 526a' extending in the main scanning direction may be disposed so as to face the scanning line. Alternatively, as shown in FIG. 10B, a rectangular fluorescent light guide member 526" may be disposed at an oblique angle with respect to the phosphor layers 402A and 402B, and a mirror 528 may be disposed so as to reflect the light, which is emitted by the position being scanned toward the mirror 528, toward the fluorescent light guide member 526". Also, the two photodetectors need not necessarily be provided on both end faces of the fluorescent light guide member, and a single photodetector may be provided on one end face of the fluorescent light guide member. In this case, a reflection member such as a deposition film formed of aluminium or the like, a metal surface or a white paint layer may be provided on the end face on which no photodetector is provided. As the photodetector, a photoconductor type photodetector, a PIN photodiode or the like may also be employed.

The photoelectric read-out means, which comprises the long photomultiplier or the fluorescent light guide member, is small and therefore contributes to making the overall apparatus small. As the photoelectric read-out means, it is also possible to use a known means comprising a light guide member having a light input face extending along the main scanning line and a cylindrical light output face, with a comparatively small photomultiplier in close contact with the light output face of the light guide member.

A further embodiment of the third radiation image recording and read-out apparatus in accordance with the present invention will hereinbelow be described with reference to FIG. 11. In this embodiment, a first image read-out means 620 in the first read-out and erasing unit 404 and a second image read-out means 620' in the second read-out and erasing unit 404' are each provided with a stimulating ray irradiation means for linearly irradiating the stimulating rays, and a line sensor as the photoelectric read-out means for detecting the light emitted by the stimulable phosphor layer exposed to the stimulating rays. The emitted light is detected by being divided into picture elements. Also, the first stimulable phosphor layer 402B is overlaid directly on the upper surface of the radiation energy converting filter 405, and the second stimulable phosphor layer 402B' is overlaid directly on the lower surface of the radiation energy converting filter 405. The configuration of the first read-out and erasing unit 404 is the same as the configuration of the second read-out and erasing unit 404', and therefore only the first image read-out means 620 in the first read-out and erasing unit 404 will be described below.

Figure 11:
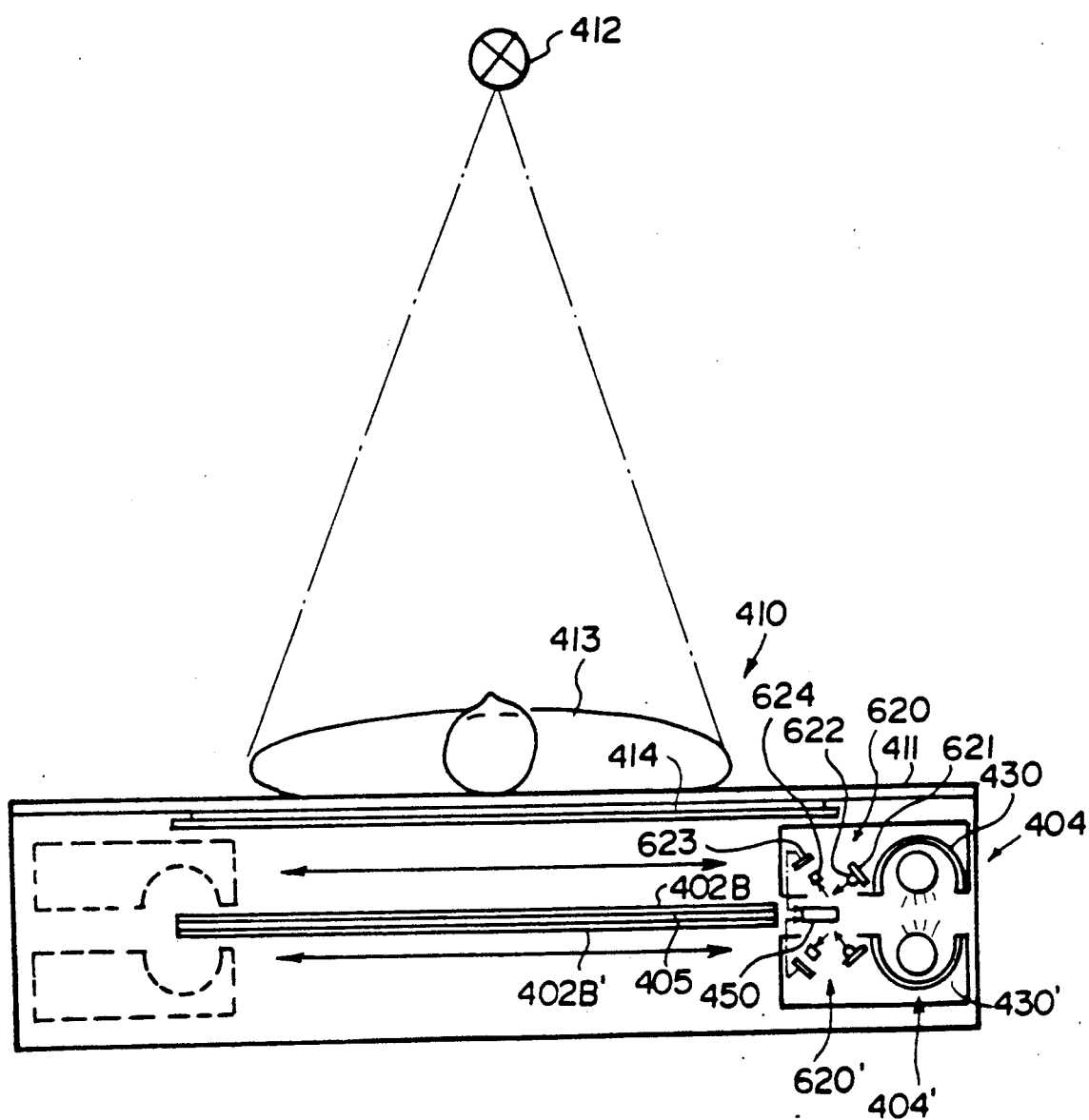
FIG. 11 is a schematic side view showing a further embodiment of the third radiation image recording and read-out apparatus in accordance with the present invention.

The stimulating ray irradiation means of the first image read-out means 620 comprises a LED array 621 constituted of light emitting diodes (LED's) arrayed along a line normal to the plane of the sheet of FIG. 11, and a cylindrical lens 622 provided on the stimulating ray radiating face of the LED array 621. The photoelectric read-out means is constituted of a line sensor 623 and a microlens array 624, provided below the line sensor 623. The microlens array 624 comprises a plurality of microlenses arrayed integrally to correspond to the respective light receiving elements of the line sensor 623, and efficiently guides the light emitted by the first stimulable phosphor layer 402B into the line sensor 623.

Figure 12:
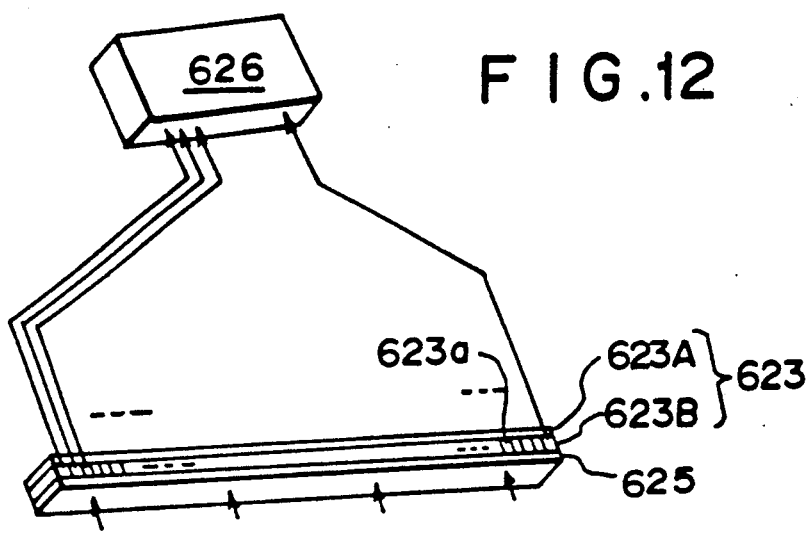
FIG. 12 is a schematic perspective view showing a line sensor.

The stimulating rays produced by the LED array 621 and converged by the cylindrical lens 622 impinge upon the first stimulable phosphor layer 402B along a straight line perpendicular to a line along the direction of movement of the first read-out and erasing unit 404. As the first stimulable phosphor layer 402B is linearly scanned by the stimulating rays, the scanned portion emits light in proportion to the stored radiation energy. A shown in FIG. 12, the emitted light impinges upon the line sensor 623 (specifically, upon a light receiving device array 623B) after passing through a filter 625 for selectively transmitting the light emitted by the first stimulable phosphor layer 402B. The light receiving device array 623B comprises a plurality of solid state photoelectric conversion devices 623a, 623a, . . . corresponding to respective picture elements and arrayed across the width of the first stimulable phosphor layer 402B. The light emitted by the first stimulable phosphor layer 402B is received simultaneously by the solid state photoelectric conversion devices 623a, 623a, . . . Upon receiving the emitted light, the devices 623a, 623a, . . . temporarily generate photocarriers and a signal dependent on the number of photocarriers generated is obtained. The signals are stored temporarily and are sequentially read out by a scanning circuit 626, after which read-out of a single linear exposed portion (corresponding to a single scanning line) of the first stimulable phosphor layer 402B is finished.

Then, the first read-out and erasing unit 404 is moved by the unit movement means (not shown in FIG. 11) leftward in FIG. 11 by a distance equal to the spacing of a single scanning line, and the aforesaid read-out step is repeated. The read-out operation is repeated over the overall surface of the first stimulable phosphor layer 402B, and the radiation image stored on the overall surface of the first stimulable phosphor layer 402B is read out.

Figure 13:
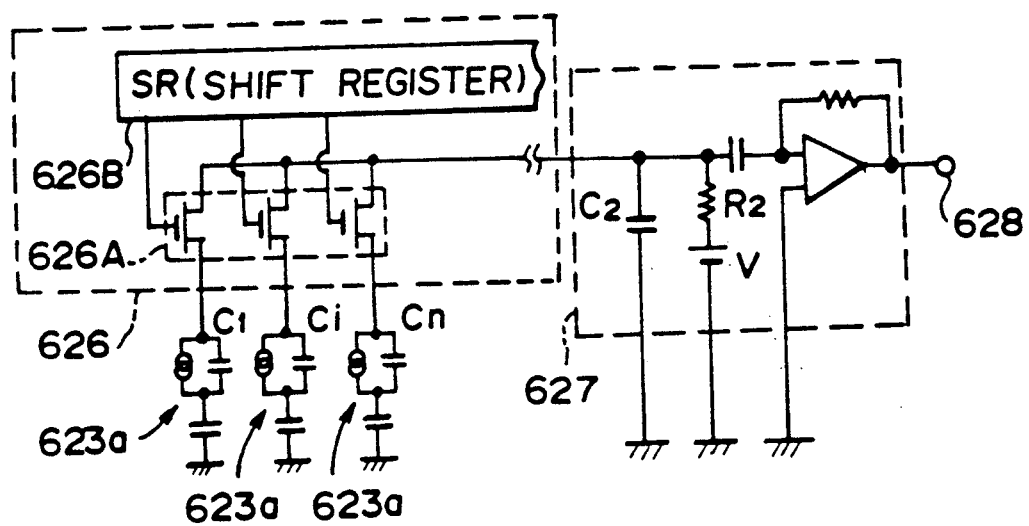
FIG. 13 is a circuit diagram showing scanning circuitry for the line sensor.

The scanning circuit 626 following the line sensor 623 will be described hereinbelow. FIG. 13 is an equivalent circuit diagram showing a line sensor using a photoconductor and a scanning circuit. Photocarriers generated when light emitted by the first stimulable phosphor layer 402B impinges upon the solid state photoelectric conversion devices 623a, 623a, . . . are accumulated in capacitors $C_i$ ($i = 1, 2, \ldots, n$) of the solid state photoelectric conversion devices 623a, 623a, . . . The number of photocarriers accumulated in the capacitors is detected by sequentially switching a switch section 626A controlled by a shift register 626B, and time-serial image signals are obtained thereby. The image signals are then amplified by an amplifier 627 and are sent out from an output terminal 628 of the amplifier 627. From the image signals, the radiation image can be generated on a CRT, or a hard copy of the radiation image can be obtained with a scanning recording apparatus or the like.

The switch section 626A and the shift register 626B in this embodiment are made of MOS devices, but they may also be made of charge coupled devices (CCD's).

Figure 14:
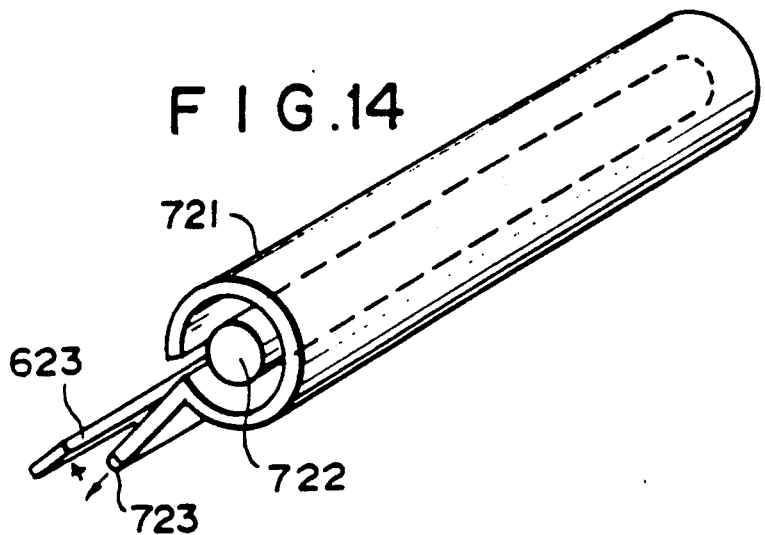
FIG. 14 is a perspective view showing the stimulating ray irradiation means utilizing the fluorescent light guide member.

As shown in FIG. 14, in cases where a line sensor is used as the photoelectric read-out means, a means utilizing the aforesaid fluorescent light guide member may be used as the means for linearly irradiating the stimulating rays. Specifically, the stimulating ray irradiation means shown in FIG. 14 comprises a long fluorescent lamp 722, a fluorescent light guide member 721 surrounding the overall circumference of the fluorescent lamp 722, and a cylindrical lens 723 provided on one edge face of the fluorescent light guide member 721. When the stimulating rays are to be irradiated, the fluorescent lamp 722 is turned on, and fluorescence is generated in the fluorescent light guide member 721. The fluorescence is radiated out of one edge face of the fluorescent light guide member 721 via the cylindrical lens 723, and used as linear stimulating rays. As the material of the fluorescent light guide member 721, any material generating fluorescence having a wavelength within the stimulation wavelength range of the stimulable phosphor layer upon exposure to the light produced by the fluorescent lamp may be selected. The fluorescent lamp may be replaced by a sodium lamp, a mercury vapor lamp, an electroluminescent panel or the like.

The configuration of the first read-out and erasing unit 404 need not necessarily be the same as the configuration of the second read-out and erasing unit 404'. Also, the first stimulable phosphor layer 402B and the second stimulable phosphor layer 402B' may be combined integrally with the radiation energy converting filter 405 or may be provided separately from the radiation energy converting filter 405 regardless of the configurations of the first read-out and erasing unit 404 and the second read out and erasing unit 404'.

I claim:

1. A radiation image recording and read-out apparatus comprising:
   (i) a first stimulable phosphor layer,
   (ii) a second stimulable phosphor layer provided parallel to said first stimulable phosphor layer,
   (iii) a radiation energy converting filter provided between said first stimulable phosphor layer and said second stimulable phosphor layer,
   (iv) an image recording section for irradiation radiation carrying image information onto said first stimulable phosphor layer and said second stimulable phosphor layer, thereby to store radiation images on said first stimulable phosphor layer and said second stimulable phosphor layer,
   (v) a first read-out and erasing unit comprising, combined into a single unit:
      (a) a first image read-out means provided with a stimulating ray irradiation means for irradiating stimulating rays in a predetermined direction, which stimulating rays cause said first stimulable phosphor layer carrying the radiation image stored thereon to emit light in proportion to the stored radiation energy, and a photoelectric read-out means for reading out the emitted light and generating an image signal, and (b) a first erasing means for releasing radiation energy remaining on said first stimulable phosphor layer on which the image read-out process has been finished, (iv) a second read-out and erasing unit comprising, combined into a single unit;

(a) a second image read-out means provided with a stimulating ray irradiation means for irradiating stimulating rays in a predetermined direction, which stimulating rays cause said second stimulable phosphor layer carrying the radiation image stored thereon to emit light in proportion to the stored radiation energy, and a photoelectric read-out means for reading out the emitted light and generating an image signal, and (b) a second erasing means for releasing radiation energy remaining on said second stimulable phosphor layer on which the image read-out process has been finished, (vii) a first unit movement means for reciprocally moving said first read-out and erasing unit in a direction normal to the direction of irradiation of said stimulating rays such that said first unit movement means faces said first stimulable phosphor layer and said first unit movement means moves said first read-out and erasing means in a first direction for effecting read-out and in an opposing return direction for effecting erasing, (viii) a second unit movement means for reciprocally moving said second read-out and erasing unit in a direction normal to the direction of irradiation of said stimulating rays such that said second unit movement means faces said second stimulable phosphor layer and said second unit movement means moves said second read-out and erasing means in a second direction for affecting read-out and in an opposing return direction for effecting erasing, and (ix) a subtraction operating section for obtaining an image signal for forming an image of a specific structure, which image signal is extracted from said image information by carrying out subtraction processing of corresponding picture elements of said image signals obtained by said first read-out and erasing unit and said second read-out and erasing unit, wherein said first stimulable phosphor layer, said second stimulable phosphor layer, and said radiation energy converting filter are supported at an image recording position facing said image recording section, said first read-out and erasing unit carries out image read-out and erasing for said first stimulable phosphor layer, and said second read-out and erasing unit carries out image read-out and erasing for said second stimulable phosphor layer.

* * * * *